(12) United States Patent
Okada et al.

(10) Patent No.: US 6,597,419 B1
(45) Date of Patent: Jul. 22, 2003

(54) LIQUID CRYSTAL DISPLAY INCLUDING FILTER MEANS WITH 10-70% TRANSMITTANCE IN THE SELECTIVE REFLECTION WAVELENGTH RANGE

(75) Inventors: Masakazu Okada, Kyoto; Kenji Nishiguchi, Kawasaki, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/605,457

(22) Filed: Jun. 28, 2000

(30) Foreign Application Priority Data

| Jul. 2, 1999 | (JP) | ............................. 11-189334 |
| Aug. 3, 1999 | (JP) | ............................. 11-220557 |

(51) Int. Cl.[7] ..................... G02F 1/1335; G02F 1/1347
(52) U.S. Cl. ..................... 349/104; 349/106; 349/74
(58) Field of Search ................. 349/104, 105, 349/106, 74

(56) References Cited

U.S. PATENT DOCUMENTS 5,929,953 A * 7/1999 Hiji et al. ..................... 349/86
6,034,752 A * 3/2000 Khan et al. ................. 349/115

FOREIGN PATENT DOCUMENTS

JP          10-031210          2/1998

* cited by examiner

Primary Examiner—William L. Sikes
Assistant Examiner—Tarifur R. Chowdhury
(74) Attorney, Agent, or Firm—Sidley Austin Brown & Wood LLP

(57) ABSTRACT

Disclosed is a reflective type multilayer liquid crystal display having a blue liquid crystal light control layer, a green liquid crystal light control layer, and a red liquid crystal light control layer stacked in this order from a viewing side. The half width of a reflection spectrum of any of the liquid crystal light control layers is larger than that of the adjoining liquid crystal light control layer on the viewing side. Further, the maximum reflectance of the reflection spectrum of any of the liquid crystal light control layers is higher than that of the adjoining liquid crystal light control layer on the viewing side. In one embodiment, the chromaticity coordinate position, in the XYZ colorimetric system, of a color displayed when all the liquid crystal light control layers are in a state of reflecting at the maximum reflectance is present in a range within a distance of 0.02 from the chromaticity coordinate position of the standard white point.

57 Claims, 26 Drawing Sheets

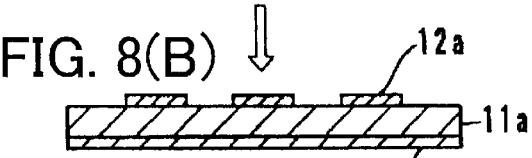
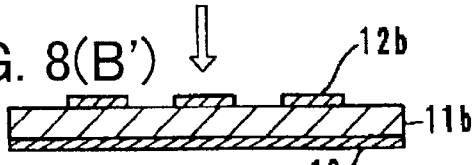
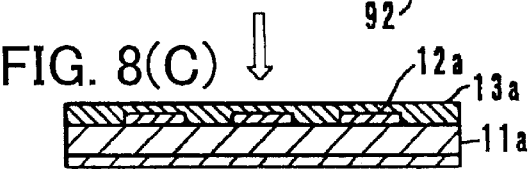
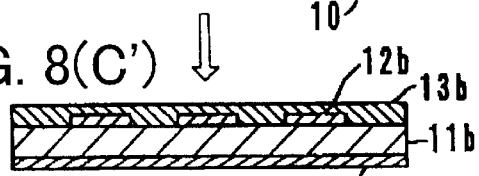
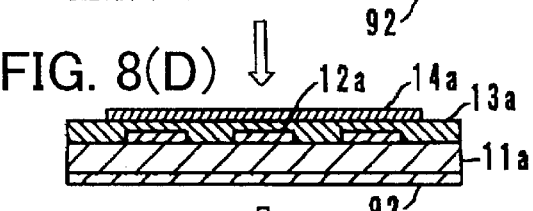
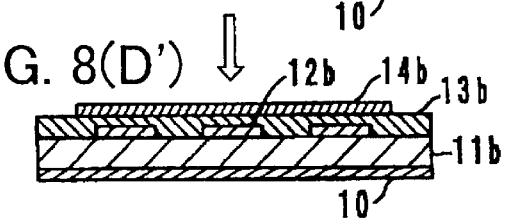
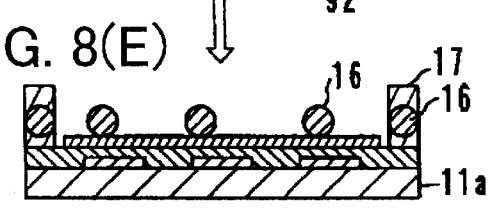
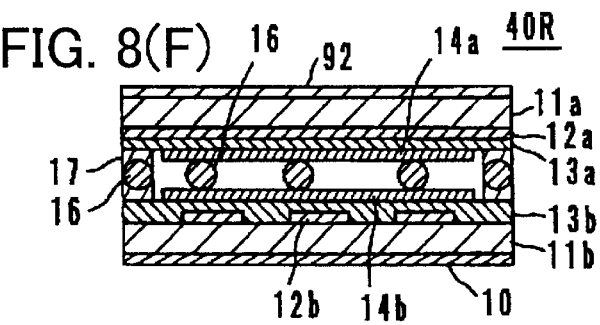

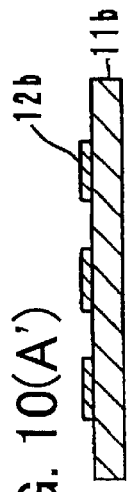 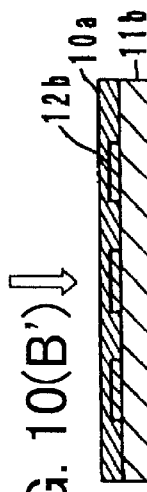 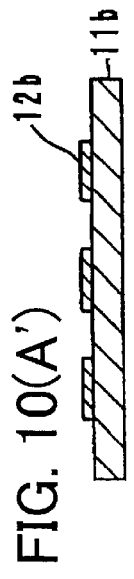 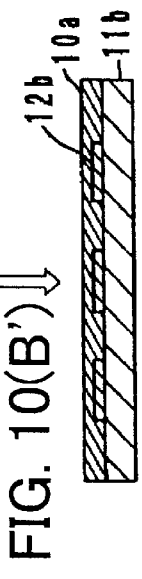 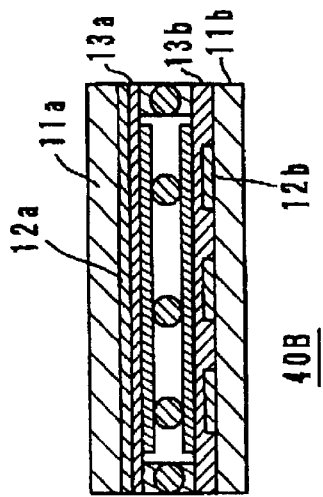 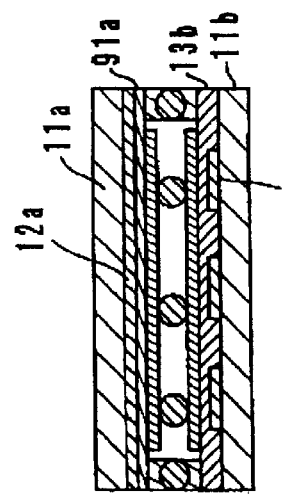  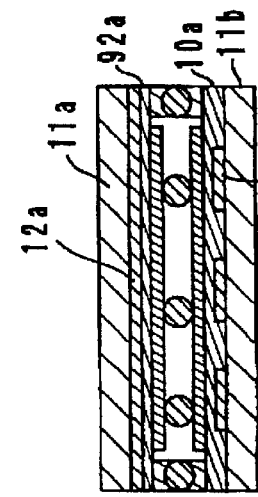

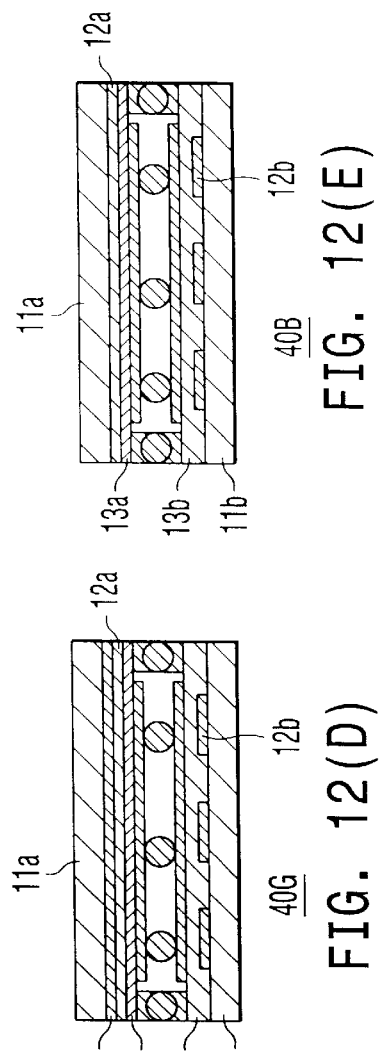
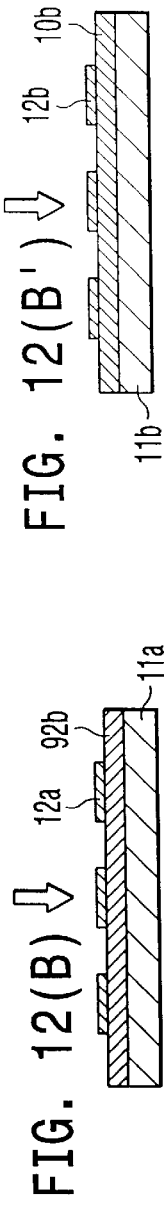
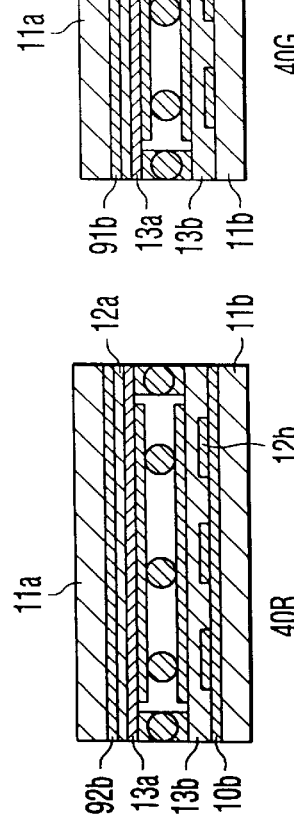
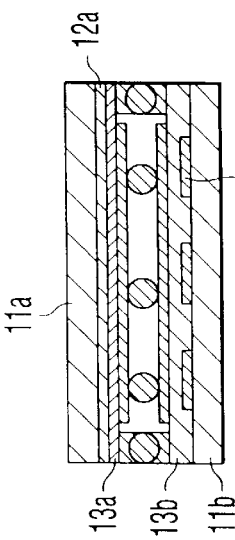

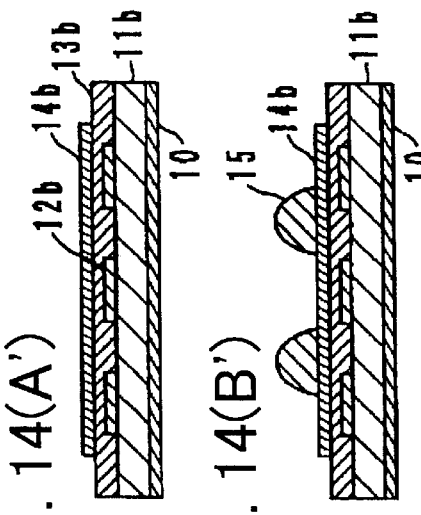
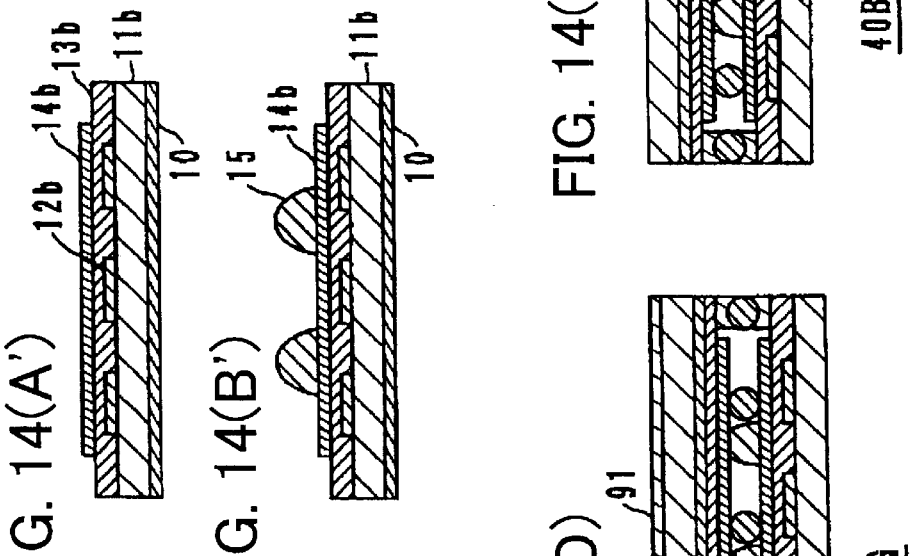
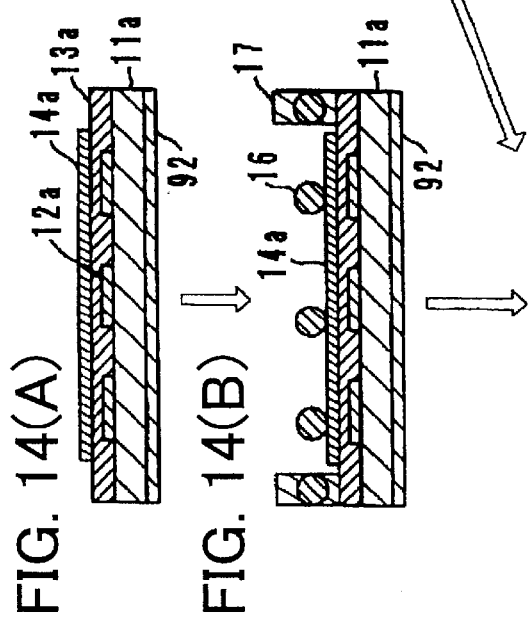
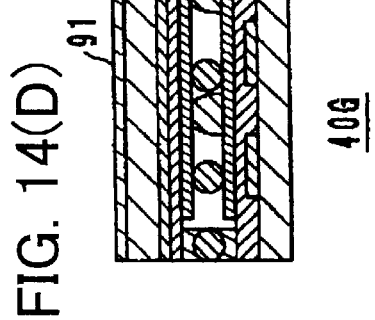
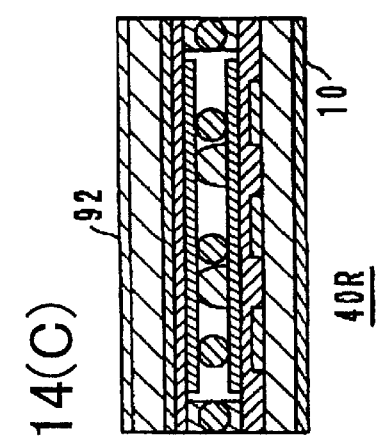

LIQUID CRYSTAL DISPLAY INCLUDING FILTER MEANS WITH 10-70% TRANSMITTANCE IN THE SELECTIVE REFLECTION WAVELENGTH RANGE

This application is based on Japanese Patent Application Nos. 11-189334 and 11-220557 respectively filed on Jul. 2, 1999 and Aug. 3, 1999 in Japan, the entire content of which is hereby incorporated by reference.

BACKGROUND OF THE INVENTION

1. Field of the Invention

The present invention relates to a liquid crystal display in which a plurality of liquid crystal light control layers is stacked. In particular, the present invention relates to a reflective type liquid crystal color display having a plurality of liquid crystal light control layers, each of which includes a liquid crystal light control material exhibiting a cholesteric phase.

2. Description of the Related Art

In recent years, research and development of thin, low-power-consumption and bright reflective type color displays has been performed. Of such displays, a reflective type color display using a selective reflection characteristic of a cholesteric liquid crystal material receives attention. In the reflective type color display, the following layers are stacked: a liquid crystal light control layer having the peak of the selective reflection wavelength in the wavelength region of red liquid crystal light control layer); a liquid crystal light control layer having the peak of the selective reflection wavelength in the wavelength region of green (G liquid crystal light control layer); and a liquid crystal light control layer having the peak of the selective reflection wavelength in the wavelength region of blue (B liquid crystal light control layer). The reflective type color display achieves high brightness because it does not use a polarizing plate. In addition, since the cholesteric liquid crystal material exhibits a memory effect, the reflective type color display is low in power consumption, can be simple-matrix-driven, and can be manufactured inexpensively. For these reasons, the reflective type color display receives attention.

However, since the selective reflection wavelength of cholesteric liquid crystal has angle dependence in principle, the color tone varies according to the viewing position (viewing angle). With respect to this problem, Japanese Laid-open Patent Publication No. 10-31210A proposes a reflective type color display in which a B liquid crystal light control layer, a G liquid crystal light control layer and an R liquid crystal light control layer are stacked in this order from the extraneous light incident side. In this reflective type color display, a filter layer absorbing blue light and transmitting green light and red light is provided between the B liquid crystal light control layer and the G liquid crystal light control layer, and a filter layer absorbing blue light and green light and transmitting red light is provided between the G liquid crystal light control layer and the R liquid crystal light control layer.

However, the transmittance of the filter layers shown in that publication is substantially zero in the wavelength regions absorbed by the filter layers (see FIG. 4 of the publication). In a display provided with such filter layers, the transmittance is as low as approximately 80% even in the wavelength regions to be transmitted by the filters, so that the display screen is extremely dark.

Moreover, the wavelength regions absorbed by the filter layers are extremely close to the selective reflection wavelengths of the liquid crystal light control layers. Therefore, only by changing the viewing angle several degrees from the front, the selective reflection wavelengths of the liquid crystal light control layers shift into the regions absorbed by the filter layers, so that the display on the screen disappears. As described above, a problem of reduction in viewing angle characteristic arises in the color display of the prior art taught by the publication.

Apart from the above-mentioned problem, a multilayer liquid crystal display in which a plurality of liquid crystal light control layers using a liquid crystal material exhibiting a cholesteric phase is stacked is subject to various limitations in order to provide display with excellent color balance. In particular, the reflection characteristic of each of the stacked liquid crystal light control layers and the transmission characteristics of members such as the substrates sandwiching the liquid crystal light control layers and the electrodes formed on the substrates are extremely important. As an example, an RGB multilayer liquid crystal display in which an R liquid crystal light control layer, a G liquid crystal light control layer and a B liquid crystal light control layer are stacked in this order from the viewing side will be examined.

In the multilayer liquid crystal display, light reflected from the B liquid crystal light control layer disposed farthest from the viewing side cannot be viewed unless it passes through the two R and G liquid crystal light control layers disposed on the viewing side of the B liquid crystal light control layer and the members such as the substrates sandwiching the liquid crystal light control layers and the electrodes formed on the substrates. Therefore, the use efficiency of the light incident on the B liquid crystal light control layer and the light reflected at the B liquid crystal light control layer is low. Consequently, when the liquid crystal light control layers have the same reflectance, red is comparatively intense and blue is comparatively weak in the display, so that the color balance is inferior. When indium tin oxide (ITO) electrodes, which have the property of absorbing blue light, are used as the electrodes, the display characteristic of blue further deteriorates.

Moreover, as mentioned above, the selective reflection of cholesteric phase liquid crystal has viewing angle dependence. Therefore, when light is obliquely incident on the display screen or when the display screen is viewed from a slanting direction, the selective reflection wavelength shifts toward the shorter wavelength side, so that the hue of the displayed color changes. The amount of the shift increases as the selective reflection wavelength increases. In the above-described RGB multilayer liquid crystal display, in a case where the half widths of the liquid crystal light control layers are substantially the same, when the display screen is viewed from a slanting direction, the selective reflection wavelength of the R liquid crystal light control layer shifts comparatively substantially, so that the hue of the displayed red significantly changes. As a result, it is difficult to provide excellent display.

SUMMARY OF THE INVENTION

Accordingly, a primary object of the present invention is to provide an improved multilayer liquid crystal color display.

Another object of the present invention is to provide a liquid crystal display in which reduction in contrast is suppressed so that the display screen does not become dark.

Yet another object of the present invention is to provide a liquid crystal display in which reduction in contrast is suppressed so that the viewing angle characteristic does not deteriorate Still another object of the present invention is to provide a liquid crystal display in which deterioration in viewing angle characteristic and reduction in the brightness of the display screen are suppressed.

A still further object of the present invention is to provide a multilayer liquid crystal display in which a plurality of liquid crystal light control layers is stacked, wherein the light use efficiency is high, the change in hue caused when the viewing direction is changed is small and the color balance of the displayed color is excellent.

To achieve at least one of the above-mentioned objects, a liquid crystal display according to a first aspect of the present invention comprises: a plurality of liquid crystal light control layers each of which includes liquid crystal exhibiting a cholesteric phase and having a peak wavelength of a selective reflection wavelength range of a reflection spectrum in the visible wavelength range, the liquid crystal light control layers being stacked in such order that the peak wavelength of any of the liquid crystal light control layers is larger than that of the adjoining liquid crystal light control layer on the viewing side, wherein a half width of the reflection spectrum of any of the liquid crystal light control layers is larger than that of the adjoining liquid crystal light control layer on the viewing side, wherein a maximum reflectance of the reflection spectrum of any of the liquid crystal light control layers is higher than that of the adjoining liquid crystal light control layer on the viewing side, and wherein the chromaticity coordinate position, in the XYZ calorimetric system, of a color displayed when all the liquid crystal light control layers are in a state of reflecting at the maximum reflectance is present in a range within a distance of 0.02 from the chromaticity coordinate position of the standard white point.

In the liquid crystal display having the above-described structure, each of the liquid crystal light control layers may be sandwiched between a pair of substrates. The electrodes may also be formed on each of the substrates. The substrate arrangement may be as follows: Only one substrate (common substrate) is disposed between two adjoining liquid crystal light control layers and the common substrate is used for holding the two liquid crystal light control layers. The electrodes may be formed directly on the substrate or may be formed on the substrate with another layer (for example, a subsequently-described filter layer) in between. Another layer (for example, an insulating layer or the subsequently-described filter layer) may be provided on the electrodes.

In the liquid crystal display having the above-described structure, the substrates are, for example, all transparent substrates. The substrate situated farthest from the viewing side is not necessarily transparent. Examples of the transparent substrate material include resins such as polyethylene terephthalate, polycarbonate and polyether sulfone, and glass. It is desirable that the transparent substrates have sufficient transmittance in the visible wavelength region. The electrodes which the multilayer liquid crystal display is provided with are, for example, all transparent electrodes. The electrode disposed farthest from the viewing side is not necessarily transparent. Examples of the transparent electrodes include ones made of a material such as ITO, $SnO_2$ or $InO_3$, and ones made of thin metal films. The electrodes can be formed on the substrates, for example, by a sputtering method, a vacuum evaporation method or a printing method.

Examples of the liquid crystal, exhibiting a cholesteric phase, of the liquid crystal light control layers include cholesteric liquid crystal, and chiral nematic liquid crystal formed by adding a chiral agent to nematic liquid crystal so that a desired helical pitch is obtained. The liquid crystal light control layers may include, for example, spacers for adjusting the thickness of the liquid crystal (the substrate-to-substrate gap) in addition to the liquid crystal exhibiting a cholesteric phase.

The liquid crystal light control layers can be formed, for example, by filling, by a vacuum filling method, liquid crystal exhibiting a cholesteric phase into the space surrounded by the substrates and a sealing wall provided on a peripheral part between the substrates. Moreover, the liquid crystal light control layers can be formed, for example, by forming the sealing wall on one of the substrates, dropping liquid crystal exhibiting a cholesteric phase onto either one of the substrates and superposing the other substrate on the substrate.

In the multilayer liquid crystal display of the present invention described above, for example, three liquid crystal light control layers, i.e., an R liquid crystal light control layer, a G liquid crystal light control layer, and a B liquid crystal light control layer, are stacked. In the description that follows, the multilayer liquid crystal display will be referred to as an RGB multilayer liquid crystal display.

A filter means may be provided on the viewing side of or in at least one of the liquid crystal light control layers for the purpose of absorbing at least part of light components in a wavelength range shorter than the selective reflection wavelength range of the at least one of the liquid crystal light control layers. By providing the filter means, the color purity of the at least one liquid crystal light control layer is improved.

The filter means may be selected from a filter layer provided on the viewing side of the at least one of the liquid crystal light control layer, and a coloring agent added to the at least one of the liquid crystal light control layer.

The filter means does not necessarily absorb light of all the wavelengths shorter than the selective reflection wavelength range of the at least one of the liquid crystal light control layers. For example, it is necessary for the filter means only to absorb light of wavelengths in the visible region shorter than the selective reflection wavelength range of the liquid crystal light control layer. The filter layer may be disposed, for example, between the electrodes on the viewing side of the at least one of the liquid crystal light control layers and the at least one of the liquid crystal light control layers or between the electrode on the viewing side of the at least one of the liquid crystal light control layers and the substrate where the electrodes are formed. The filter layer can be formed, for example, by applying a light absorbing material (filter material) to a predetermined surface by a spin coating method or a printing method. The filter layer can also be formed by pasting a film made of a light absorbing material (filter material) onto a predetermined surface. The reason why such a filter means is provided will be mentioned later. It is desirable to provide the filter means for each of the liquid crystal light control layers.

In the above-described multilayer liquid crystal display of the present invention, a plurality of liquid crystal light control layers is stacked in such order that the peak wavelength of the selective reflection wavelength range of the reflection spectrum of any of the liquid crystal light control layers is larger than that of the adjoining liquid crystal light control layer on the viewing side. That is, when the multilayer liquid crystal display has a number n (n is an integer not less than 2) of stacked liquid crystal light control layers, the following expression 1 is satisfied:

$$\lambda 1 < \lambda 2 < \ldots < \lambda n \quad (1)$$

where the peak wavelengths of the liquid crystal light control layers are $\lambda 1, \lambda 2, \ldots, \lambda n$ from the viewing side.

That is, the farther from the viewing side a liquid crystal light control layer is, the larger the peak wavelength of the liquid crystal light control layer is. In the above-described RGB multilayer liquid crystal display, the liquid crystal light control layers are disposed in the order of the B liquid crystal light control layer, the G liquid crystal light control layer and the R liquid crystal light control layer from the viewing side. The reason why the relationship of the expression 1 is satisfied will be mentioned later.

Moreover, the half width of the reflection spectrum of any of the liquid crystal light control layers is larger than that of the adjoining liquid crystal light control layer on the viewing side. That is, when the multilayer liquid crystal display has a number n (n is an integer not less than 2) of stacked liquid crystal light control layers, the following expression 2 is satisfied:

$$\Delta \lambda 1 < \Delta \lambda 2 < \ldots < \Delta \lambda n \quad (2)$$

where the half widths of the reflection spectrums of the liquid crystal light control layers are $\Delta \lambda 1, \Delta \lambda 2, \ldots, \Delta \lambda n$ from the viewing side.

That is, the farther from the viewing side a liquid crystal light control layer is, the larger the half width of the reflection spectrum of the liquid crystal light control layer is. The reason why the relationship of the expression (2) is satisfied will be mentioned later. The half width $\Delta \lambda$ of the reflection spectrum of the liquid crystal light control layer is ($\lambda H - \lambda L$). The wavelengths $\lambda H$ and $\lambda L$ ($\lambda H > \lambda L$) are wavelengths where the reflectances of the liquid crystal light control layer are ½ the reflectance when the liquid crystal light control layer reflects light of the peak wavelength of the reflection spectrum. In the description that follows, the half width of the reflection spectrum will sometimes be referred to merely as half width.

Moreover, the maximum reflectance of any of the liquid crystal light control layers is higher than that of the adjoining liquid crystal light control layer on the viewing side. That is, when the multilayer liquid crystal display has a number n (n is an integer not less than 2) of stacked liquid crystal light control layers, the following expression 3 is satisfied:

$$\%R1 < \%R2 < \ldots < \%Rn \quad (3)$$

where the maximum reflectances of the liquid crystal light control layers are $\%R1, \%R2, \ldots, \%Rn$ from the viewing side.

That is, the farther from the viewing side a liquid crystal light control layer is, the higher the maximum reflectance of the liquid crystal light control layer is. The reason why the relationship of the expression (3) is satisfied will be mentioned later.

The peak wavelengths to $\lambda 1$ to $\lambda n$, the half widths $\Delta \lambda 1$ to $\Delta \lambda n$ and the maximum reflectances $\%R1$ to $\%Rn$ are values measured in a condition where the liquid crystal light control layers are not stacked.

In the above-described multilayer liquid crystal display of the present invention, the chromaticity coordinate position P of a color displayed when all the liquid crystal light control layers are in a state of reflecting at the maximum reflectance is present in a range within a distance of 0.02 from the chromaticity coordinate position of the standard white point.

That is, the distance d between the chromaticity coordinate position P of the color displayed when all the liquid crystal light control layers are in a state of reflecting at the maximum reflectance and the chromaticity coordinate position P0 of the standard white point is not more than 0.02. The chromaticity coordinate position P(x, y) of the displayed color, the chromaticity coordinate position P0(x0, y0) of the standard white point and the distance d are all in the XYZ colorimetric system. That is, the following expression 4 is satisfied:

$$d = \sqrt{((x-x0)^2 + (y-y0)^2)} \leq 0.02 \quad (4)$$

The chromaticity coordinate position of the displayed color is measured by using as the light source a standard illuminant $D_{65}$, a standard illuminant A, a standard illuminant C, a fluorescent lamp $F_2$, a fluorescent lamp $F_6$, a fluorescent lamp $F_7$, a fluorescent lamp $F_8$, a fluorescent lamp $F_{10}$ or a fluorescent lamp $F_{11}$. It is necessary only that the expression 4 be satisfied when measurement is performed by use of any one of these light sources. The chromaticity coordinate position of the standard white point corresponds to the light source used for the measurement. For example, when the standard illuminant $D_{65}$ is used, the chromatic coordinate position P0 of the standard white point is (x0, y0)=(0.3127, 0.3290), and when the standard illuminant A is used, the chromatic coordinate position P0 of the standard white point is (x0, y0)=(0.4476, 0.4074).

That the expression 4 is satisfied indicates that the color displayed when all the liquid crystal light control layers are in a state of reflecting at the maximum reflectance is white and that the hue of the displayed white is excellent. Since the expression 4 is satisfied when all the liquid crystal light control layers are in a state of reflecting at the maximum reflectance, the satisfaction of the expression 4 is advantageous when the multilayer liquid crystal display is controlled by a display drive circuit.

In the above-described RGB multilayer liquid crystal display, that the color displayed when all the liquid crystal light control layers are in a state of reflecting at the maximum reflectance is white and that the displayed white satisfies the expression 4 indicate that white is displayed with red, green and blue being well-balancedly mixed.

While a multiplicity of combinations of liquid crystal light control layers satisfying the expression 4 is possible in multilayer liquid crystal displays, in the multilayer liquid crystal display of the present invention, since the expressions 1 to 3 are also satisfied and the filter layer is provided, color purity is excellent also for the displayed color of each individual liquid crystal light control layer, mixed colors (including white) and neutral tints.

The reason why the expressions 1 to 3 are satisfied will be described. The reason why the filter layer is provided will also be described.

In the multilayer liquid crystal display of the present invention, the liquid crystal light control layers each include liquid crystal exhibiting a cholesteric phase as mentioned above. The reflection spectrum of a liquid crystal light control layer when the liquid crystal of the liquid crystal light control layer is in planar state roughly depends on the cholesteric pitch (helical pitch), the refractive index anisotropy and the thickness (substrate-to-substrate gap) of the liquid crystal. The cholesteric pitch, the refractive index anisotropy and the liquid crystal thickness affect the reflection spectrum, the half width and the maximum reflectance of the liquid crystal light control layer under perfect diffuse illumination, respectively. In order for a multilayer liquid crystal display to provide display with excellent color purity, etc., it is necessary that the characteristic values of each of the liquid crystal light control layers be well matched.

When chiral nematic liquid crystal formed by adding a chiral agent to nematic liquid crystal is used as the liquid crystal, exhibiting a cholesteric phase, of the liquid crystal light control layers, the cholesteric pitch of the liquid crystal can be adjusted by the amount of addition of the chiral agent that supplies a twisting force to nematic liquid crystal which is the host liquid crystal. By increasing the adding amount of the chiral agent, the twisting force increases to shorten the cholesteric pitch, so that the selective reflection wavelength is shortened. The selective reflection wavelength $\lambda$ can be represented by the following expression 5:

$$\lambda = n \times P \tag{5}$$

Here, n is the average refractive index of the liquid crystal, and P is the cholesteric pitch that can be adjusted by the adding amount of the chiral agent.

The refractive index anisotropy of chiral nematic liquid crystal that affects the half width of the liquid crystal light control layer is largely dependent on the refractive index anisotropy of nematic liquid crystal which is the host liquid crystal, and is reduced by adding the chiral agent. The half width $\Delta\lambda$ can be represented by the following expression (6):

$$\Delta\lambda = \Delta n \times P \tag{6}$$

Here, $\Delta n$ is the refractive index anisotropy of chiral nematic liquid crystal, and P is the cholesteric pitch that can be adjusted by the amount of addition of the chiral agent.

The liquid crystal thickness (liquid crystal light control layer thickness) corresponds to the gap between the substrates sandwiching the liquid crystal (electrode-to-electrode gap). When spherical spacers are disposed between the substrates, the liquid crystal thickness can be adjusted by the diameter of the spacers. When the liquid crystal thickness is small, the number of helical structures that contribute to reflection is small, so that the maximum reflectance when the liquid crystal is in planar state is low. On the contrary, when the liquid crystal thickness is increased, the maximum reflectance when the liquid crystal is in planar state can be increased. Here, the number of helical structures is the number of cholesteric pitches aligned in the direction of the normal to the electrode surface (direction of the normal to the substrate surface).

A feature when liquid crystal exhibiting a cholesteric phase performs selective reflection is the transmittivity of light of wavelengths other than the wavelengths in the selective reflection wavelength region. When the transmittance of light of a wavelength longer than the selective reflection wavelength region of a liquid crystal light control layer and the transmittance of light of a wavelength shorter than the selective reflection wavelength region of the liquid crystal light control layer are compared, the transmittance of light of the longer wavelength is higher. Therefore, by disposing the liquid crystal light control layers so that liquid crystal light control layers having smaller selective reflection wavelengths are closer to the viewing side, the light use efficiency can be increased. That is, to increase the light use efficiency, the liquid crystal light control layers are stacked so as to satisfy the expression 1. In other words, the light use efficiency can be increased by stacking the liquid crystal light control layers so as to satisfy the expression 1. When ITO transparent electrodes are used as the electrodes, since ITO electrodes have the property of absorbing light in the wavelength region of blue (shorter wavelength region in the visible region), even though this property is considered, the liquid crystal light control layers are stacked so as to satisfy the expression 1.

For example, in the above-described RGB multilayer liquid crystal display, the liquid crystal light control layers are stacked in the order of the B liquid crystal light control layer, the G liquid crystal light control layer and the R liquid crystal light control layer from the viewing side. In the RGB multilayer liquid crystal display, even though ITO electrodes are used, since the B liquid crystal light control layer is disposed in the position closest to the viewing side, visible light can reach the B liquid crystal light control layer after passing through an ITO electrode only once. Therefore, compared to a case where the B liquid crystal light control layer is disposed in another position, blue is excellently displayed. Consequently, the user can visually recognize blue with ease, and colors displayed by mixing blue with other colors can also be displayed excellently.

There is another reason why the liquid crystal light control layers are stacked so as to satisfy the expression 1. This will be mentioned later.

In the multilayer liquid crystal display, it is desirable that a liquid crystal light control layer with a longer selective reflection wavelength (a longer peak wavelength) have a larger half width. This is for the following reason: The selective reflection of liquid crystal exhibiting a cholesteric phase has viewing angle dependence, and when light is obliquely incident on the display screen or the display screen is viewed from a slanting direction, the selective reflection wavelength shifts toward the shorter wavelength side, so that the hue of the displayed color changes. The amount of the shift increases as the selective reflection wavelength increases. However, when the shift amount is the same, the change in hue decreases as the half width increases. Although the change in hue decreases as the half width of the liquid crystal light control layer increases, since the purity of the color displayed by the liquid crystal light control layer alone deteriorates, the increase in half width is limited. Considering both the change in hue and the purity of the displayed color, the liquid crystal light control layers are set so that liquid crystal light control layers having longer selective reflection wavelengths have larger half widths as mentioned above. In the multilayer liquid crystal display of the present invention, since a plurality of liquid crystal light control layers is stacked so as to satisfy the expression 1 associated with the selective reflection wavelength, the liquid crystal surface layers are set so as to satisfy the expression 2 associated with the half width. By satisfying the expression 2, the change in the hue of the displayed color of each liquid crystal light control layer can be suppressed and the deterioration in the purity of the displayed color of each liquid crystal light control layer can be suppressed.

With respect to the maximum reflectance of a liquid crystal light control layer, considering the loss caused when light passes through another liquid crystal light control layer disposed on the viewing side of the liquid crystal light control layer and considering the balance among component colors when mixed colors (including white) are displayed, it is preferable that the farther from the viewing side a liquid crystal light control layer is, the higher the maximum reflectance of the liquid crystal light control layer is. That is, it is desirable that the expression 3 be satisfied. In the multilayer liquid crystal display of the present invention described above, since the expression 3 is satisfied, the balance among component colors when mixed colors are displayed is excellent accordingly, so that the mixed colors are excellent in hue.

The filter means (for instance, the filter layer) may be optionally provided for the following reason: When liquid crystal exhibiting a cholesteric phase performs selective reflection as described above, the transmittance of light of a wavelength shorter than the selective reflection wavelength region is lower than that of light of a longer wavelength. This is because of scattering within the liquid crystal exhibiting a cholesteric phase. When the reflection spectrum is observed, light of wave lengths shorter than the selective reflection wavelength region is viewed as scattered light. For example, in the above-described RGB multilayer liquid crystal display, scattering in the R liquid crystal light control layer is conspicuously observed. The R liquid crystal light control layer scatters light of the wavelength regions of green and blue as well as selectively reflects light of the wavelength region of red. Because of the scattering, the color purity of red is apt to deteriorate, and the viewability of red deteriorates. By cutting the scattered light through absorption, the purity of red can be improved. Therefore, as mentioned above, in the R liquid crystal light control layer, a red filter layer is provided that absorbs light of the wavelength regions of green and blue shorter than the selective reflection wavelength region (wavelength region of red). Likewise, in the G liquid crystal light control layer, a yellow filter layer is provided that absorbs light of the wavelength region of blue shorter than the selective reflection wavelength region (wavelength region of green). Moreover, in the B liquid crystal light control layer, an ultraviolet cut filter layer (ultraviolet absorbing filter layer) is provided that absorbs ultraviolet rays of the wavelength region shorter than the selective reflection wavelength region (wavelength region of blue). In the RGB multilayer liquid crystal display, since the B liquid crystal light control layer is disposed in the position closest to the viewing side as mentioned above, the deterioration of the liquid crystal of each liquid crystal light control layer, etc., can also be suppressed by the ultraviolet cutting filter layer provided for the B liquid crystal light control layer. It is necessary to provide the filter layer for only at least one liquid crystal light control layer as mentioned above. For example, in the RGB multilayer liquid crystal display, the filter layer may be provided for only the R liquid crystal light control layer significantly affected by the scattered light. Each of the filter layers also have the effect of decreasing the change in hue of the displayed color (angle dependence) caused, for example, when the display screen is viewed from a slanting direction.

In the multilayer liquid crystal display of the present invention, since the liquid crystal light control layers are stacked so as to satisfy the expression 1, even though the filter layer for absorbing the light of wavelength regions shorter than the selective reflection wavelength region of the liquid crystal light control layer is provided for any one or more than one of a plurality of liquid crystal light control layers, the filter layer does not absorb the light components necessary for the liquid crystal light control layer situated farther from the viewing side than the liquid crystal light control layer for which the filter layer is provided. In other words, in a case where the liquid crystal light control layers are stacked so as not to satisfy the expression 1, when a filter layer as described above is provided for a liquid crystal light control layer, there are occasions when the filter layer absorbs light of the wavelength region necessary for the liquid crystal light control layer situated farther from the viewing side than the liquid crystal light control layer for which the filter layer is provided.

Therefore, to increase the light use efficiency as mentioned above and to provide the filter layer for increasing the color purity of the displayed color of each liquid crystal light control layer, it is necessary to satisfy the expression 1. Moreover, since provision of such a filter layer for each liquid crystal light control layer makes it unnecessary to consider scattered light when the display characteristic of the multilayer liquid crystal display is optimized, designing is facilitated.

A liquid crystal display according to a second aspect of the present invention comprises: a plurality of liquid crystal light control layers each of which includes liquid crystal exhibiting a cholesteric phase and having a peak wavelength of a selective reflection wavelength range of a reflection spectrum in the visible wavelength range, the liquid crystal light control layers being stacked in such order that the peak wavelength of any of the liquid crystal light control layers is larger than that of the adjoining liquid crystal light control layer on the viewing side; and filter means provided on the viewing side of or in at least one of the liquid crystal light control layers, wherein a transmittance of the filter means is 10 to 70% in the selective reflection wavelength range of the liquid crystal light control layer situated on the viewing side of than the filter layer.

By the transmittance of the filter means being 10 to 70% in the selective reflection wavelength range of the liquid crystal light control layer situated on the viewing side than the filter means as described above, a liquid crystal display can be obtained in which the display screen does not become dark with contrast deterioration being suppressed.

A liquid crystal display according to a third aspect of the present invention comprises: a plurality of liquid crystal light control layers each of which includes liquid crystal exhibiting a cholesteric phase and having a peak wavelength of a selective reflection wavelength range of a reflection spectrum in the visible wavelength range, the liquid crystal light control layers being stacked in such order that the peak wavelength of any of the liquid crystal light control layers is larger than that of the adjoining liquid crystal light control layer on the viewing side; and filter means provided on the viewing side of or in at least one of the liquid crystal light control layers, wherein the filter means absorbs light components in a shorter wavelength range from the peak wavelength of the liquid crystal light control layer situated not closer to the viewing side than the filter means to 1.3 to 1.5 times of the half width of the reflection spectrum of the liquid crystal light control layer situated not closer to the viewing side than the filter layer, wherein a transmittance of the filter means in the shorter wavelength range is 10 to 70%.

By thus defining the transmittance of the filter means, a liquid crystal display can be obtained in which deterioration in contrast and reduction in viewing angle are suppressed.

A liquid crystal display according to a fourth aspect of the present invention comprises: a plurality of liquid crystal light control layers each of which includes liquid crystal exhibiting a cholesteric phase and having a peak wavelength of a selective reflection wavelength range of a reflection spectrum in the visible wavelength range, the liquid crystal light control layers being stacked in such order that the peak wavelength of any of the liquid crystal light control layers is larger than that of the adjoining liquid crystal light control layer on the viewing side; filter means provided on the viewing side of or in at least one of the liquid crystal light control layers, wherein the filter means absorbs light components in a shorter wavelength range of 120 to 150 nm from the peak wavelength of the liquid crystal light control layer situated not closer to the viewing side than the filter means, and wherein a transmittance in the shorter wavelength range is 10 to 70%.

By thus defining the transmittance of the filter means, a liquid crystal display can be obtained in which reduction in viewing angle and deterioration in the brightness of the display screen are suppressed.

In the liquid crystal displays according to the second to fourth aspects, similar to the first aspect of the present invention, the filter means may be in a form of (1) a filter layer provided on the viewing side of the at least one of the liquid crystal light control layers, or (2) a coloring agent added in the at least one of the liquid crystal light control layers.

In the liquid crystal displays according to the second to fourth aspects, the transmittance of the filter means in the shorter wavelength range is 10 to 70% may be a flat region of the spectral transmittance characteristic of the filter layer, a falling region in which the transmittance steeply decreases, or a region including both of these.

In the liquid crystal displays according to the second to fourth aspects, each of the liquid crystal light control layers may be sandwiched between substrates. With a total of two substrates, one holding one liquid crystal light control layer and the other holding the other liquid crystal light control layer, being present between adjoining liquid crystal light control layers, the filter layer may be provided between these two substrates. The filter layer may be provided on the side of the substrate opposite to the side which is in contact with the liquid crystal material. By doing this, the liquid crystal material and the filter layer are physically separated. Consequently, ingredients of the filter layer are prevented from melting into the liquid crystal material, so that a liquid crystal display in which the display characteristic is not degraded is obtained.

Further, in the liquid crystal displays according to the second to fourth aspects, the filter layer may be provided on the side of the substrate which is in contact with the liquid crystal material. In this case, the filter layer effectively suppresses scattering of light by the substrate.

Further, in the liquid crystal displays according to the second to fourth aspects, the filter layer may be provided between the substrate and an electrode provided on the surface, opposed to the liquid crystal light control layer, of each of the substrates sandwiching the liquid crystal light control layer. By doing this, the voltage applied to the liquid crystal light control layer can be prevented from decreasing due to the filter layer, so that the liquid crystal display can be driven at a low voltage. Moreover, scattering of light by the substrate can be effectively suppressed.

The filter layer may be provided on the electrode provided on each substrate. By doing this, scattering of light by the substrate can be effectively suppressed. Moreover, the filter layer can be used as a functional film such as an insulating film, which is effective in simplifying the device structure.

The filter layer may be provided on the side of the substrate opposite to the electrode formed side. This is advantageous in driving the liquid crystal display at a low voltage.

Further, in the liquid crystal display according to the present invention, by the substrates being made of resin films, reduction in brightness due to the stacking of a plurality of liquid crystal light control layers can be suppressed.

Further, in the liquid crystal display according to the present invention, by providing the sealing wall on a peripheral part of the pair of substrates sandwiching each liquid crystal light control layer, not only the liquid crystal material can be easily filled into the gap between the substrates but also the liquid crystal is prevented from being in contact with outside air, so that deterioration in display characteristic can be reduced.

Further, in the liquid crystal display according to the present invention, by providing a resin structure bonding and supporting the substrates sandwiching each liquid crystal light control layer at least in a predetermined position in the display region, the substrate-to-substrate gap which decides the thickness of each liquid crystal light control layer can be maintained uniform, so that a liquid crystal display in which display unevenness is extremely small can be fabricated.

Further, in the liquid crystal display according to the present invention, by disposing spacers between the pair of substrates sandwiching each liquid crystal light control layer, the substrate-to-substrate gap can be defined by the diameter of the spacers, so that a liquid crystal display in which substrate-to-substrate gap unevenness is small can be fabricated.

Further, when the spacers are fixed-by-adhesion spacers, since the spacers do not readily move even when large-size substrates or film substrates are used, variation in substrate-to-substrate gap is small and display unevenness does not readily vary with time.

BRIEF DESCRIPTION OF DRAWINGS

These and other objects, advantages and features of the invention will become apparent from the following description thereof taken in conjunction with the accompanying drawings in which:

FIGS. 2(A) to 2(F) & 2(D), 2(D') are explanatory views showing a process of fabricating the liquid crystal display of FIG. 1;

FIGS. 8(A) to 8(F) & 8(A') to 8(D') are explanatory views showing a process of fabricating the liquid crystal display of the example 1-1;

FIGS. 10(A) to 10(E) & 10(A') to 10(B') are explanatory views showing a process of fabricating the liquid crystal display of the example 1-3;

FIGS. 12(A) to 12(E) & 12(A') to 12(B') are explanatory views showing a process of fabricating the liquid crystal display of the example 1-4;

FIGS. 14(A) to 14(E) & 14(A') to 14(B') are explanatory views showing a process of fabricating the liquid crystal display of the example 1-5;

DETAILED DESCRIPTION OF THE PREFERRED EMBODIMENTS

Hereinafter, embodiments and examples of the liquid crystal display according to the present invention will be described with reference to the accompanying drawings.

(First Embodiment)

Figure 1:
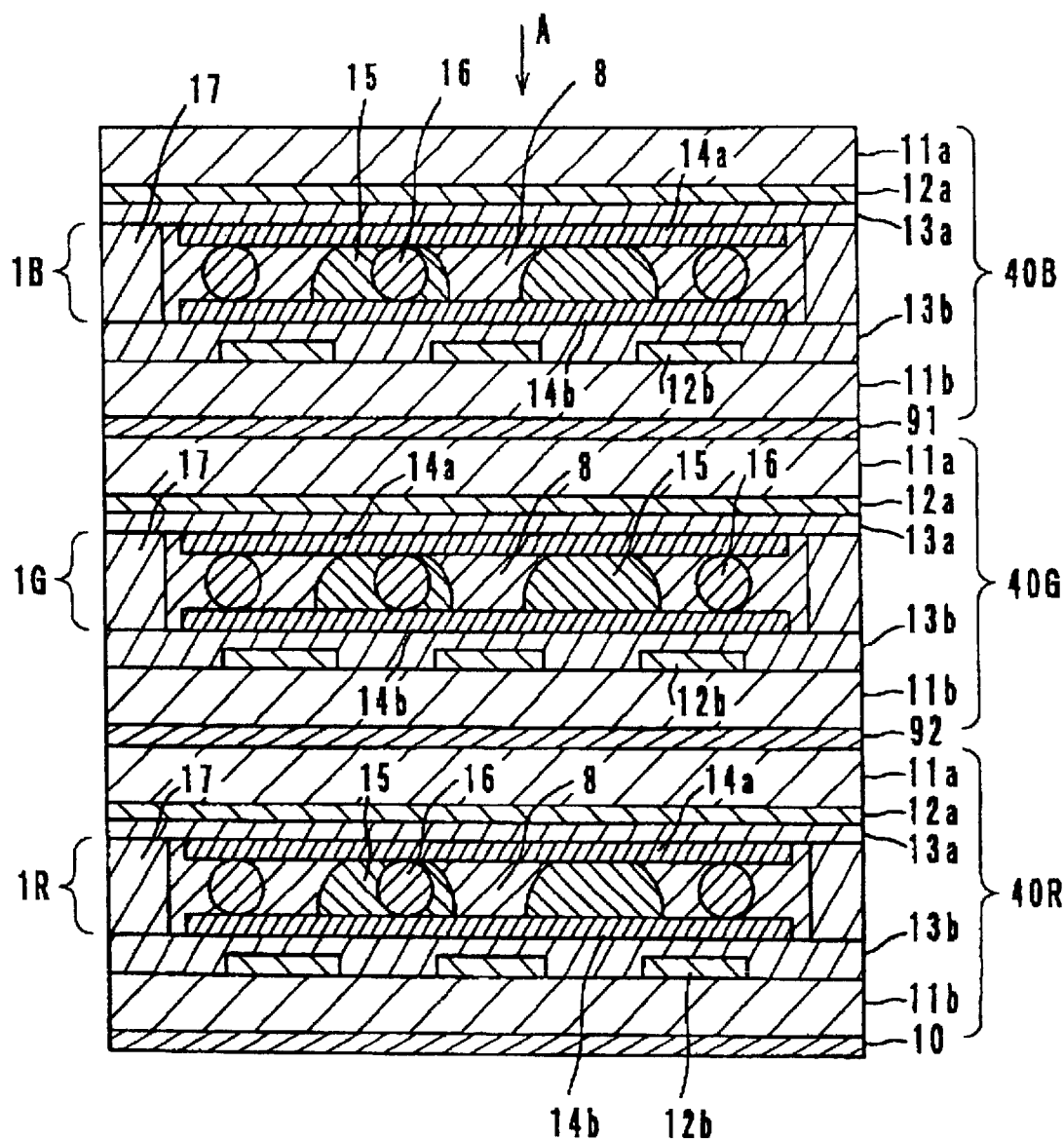
FIG. 1 is a cross-sectional view showing a basic structure of a liquid crystal display according to a first embodiment of the present invention.

In the first embodiment, a liquid crystal display using cholesteric liquid crystal will be described. FIG. 1 shows a cross section of the liquid crystal display according to the first embodiment. In the liquid crystal display, three liquid crystal light control layers 1B, 1G and 1R are stacked. The liquid crystal light control layers 1B, 1G and 1R are each sandwiched between a pair of substrates 11a and 11b to form a blue display cell 40B, a green display cell 40G and a red display cell 40R, respectively. Of the three liquid crystal light control layers, between the liquid crystal light control layers 1B and 1G, a filter layer 91 is provided, and between the liquid crystal light control layers 1G and 1R, a filter layer 92 is provided. On the substrates 11a and 11b, a plurality of strip-form electrodes 12a and 12b is formed. On the sides of the substrates 11a and 11b where the strip-form electrodes 12a and 12b are formed, insulating films 13a and 13b are provided as required, and alignment layers 14a and 14b are formed thereon as required.

Between the substrates 11a and 11b, resin structures 15 and spacers 16 are disposed. The resin structures 15 bond and support the substrates 11a and 11b. The spacers 16 define the substrate-to-substrate gap. The substrate-to-substrate gap is sealed at a peripheral part of the substrates 11a and 11b by a sealing wall 17 made of a resin material. Spacers may also be contained in the sealing wall 17.

A liquid crystal material 8 used in the first embodiment is adjusted so as to exhibit a cholesteric phase at room temperature and selectively reflect the color light of a specific wavelength band. The liquid crystal light control layers 1B, 1G and 1R are stacked so that the closer to the extraneous light incident side (i.e., the viewing side: see the arrow A) a liquid crystal light control layer is, the shorter the specific wavelength band reflected by the liquid crystal light control layer is. The filter layer 91 provided between the liquid crystal light control layers 1B and 1G and the filter layer 92 provided between the liquid crystal light control layers 1G and 1R each have the property of absorbing at least the color light of the specific wavelength region equivalent to a selective reflection wavelength region of the liquid crystal light control layer close to the viewing side, and the transmittance thereof is 10 to 70% in the specific wavelength region of each liquid crystal light control layer. On the side opposite to the viewing side, a black light absorbing layer 10 is provided.

This liquid crystal display can be formed in the manner described below (see FIGS. 2A to 2F). First, the process of forming the liquid crystal cells 40 will be described.

The strip-form electrodes 12 are formed on the transparent substrates 11 (see FIG. 2(A)). To form the strip-form electrodes 12, for example, an ITO film is formed by a sputtering method on each of the substrates 11, and then, patterning is performed by photolithography to form a plurality of strip-form electrodes. Here, it is necessary for the substrates 11 only to be transparent, and glass or a resin may be used therefor.

After the strip-form transparent electrodes 12 are formed, the transparent insulating films 13 may be formed as required (see FIG. 2(B)). The insulating films 13 can be formed by applying silicon oxide or the like by a sputtering method, a spin coating method, a dip coating method, flexography or the like. Provision of the insulating films 13 prevents a short circuit from occurring between the upper and lower electrodes 12 after the pair of substrates 11 are bonded together, and prevents the electrodes 12 from being physically shaved or chemically contaminated by a chemical or moisture in the air.

Then, the alignment layers 14 are formed as required (see FIG. 2(C)). The alignment layers 14 can be formed by applying an inorganic material such as silicon oxide or an organic material such as polyimide by a sputtering method, a spin coating method, a roll coating method, flexography or the like. Normally, the alignment layers 14 are used without being rubbed. Provision of the alignment layers 14 is advantageous in that the characteristic of the liquid crystal display is prevented from changing with time because it is possible to provide liquid crystal molecules with a certain degree of anchoring effect.

Then, the resin structures 15 are formed on one substrate 11b (see FIG. 2(D)). The resin structures 15 can be formed by printing a thermoplastic resin or a polymerizable resin by use of a printing method using a screen plate or a metal mask, or by photolithography in which a photosensitive resin is applied to one substrate 11b by use of a spin coating method, a roll coating method or a die coater, is exposed through a photomask and is then developed.

Figure 2:
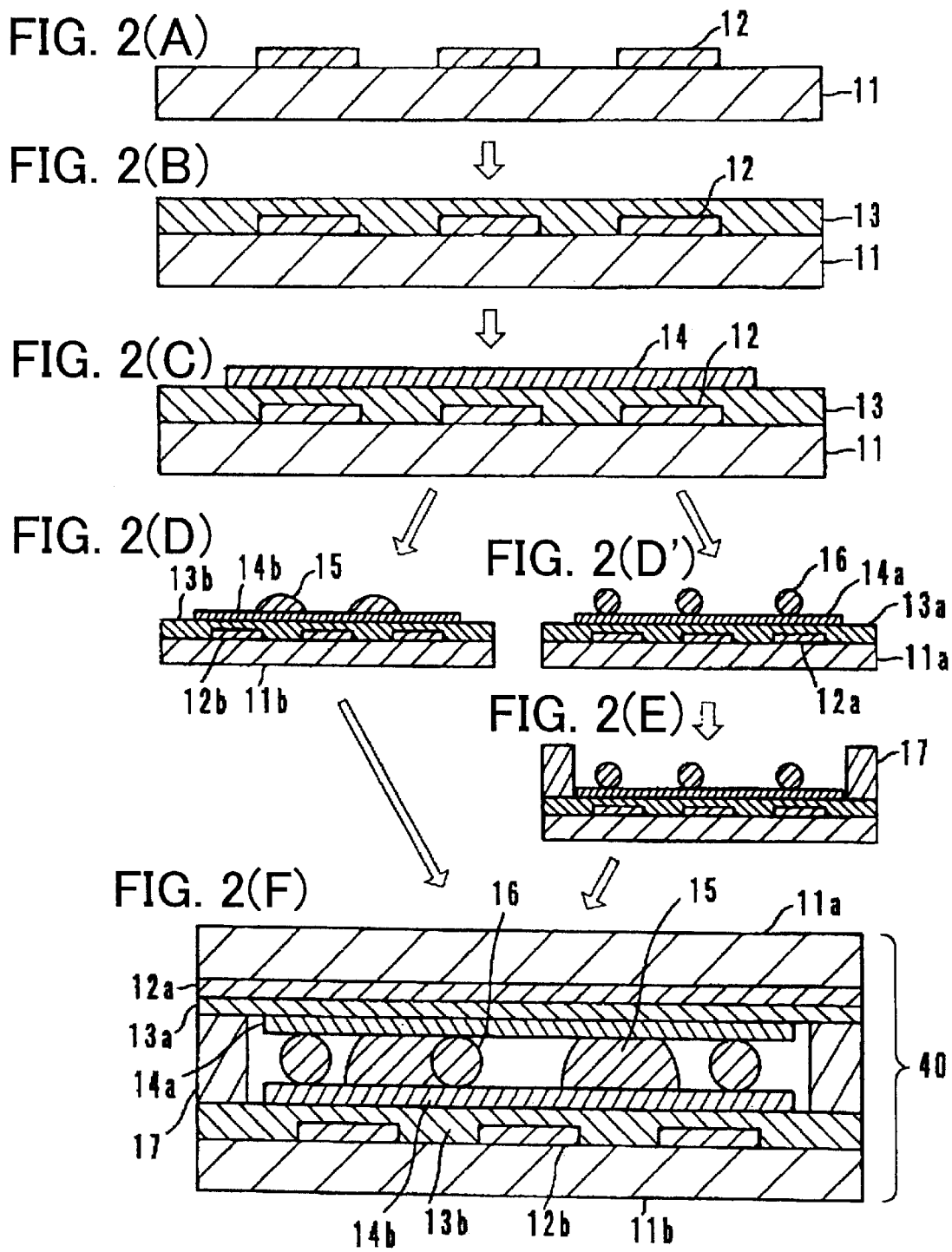

On the other hand, the spacers 16 are sprayed over the substrate 11a (see FIG. 2(D')). As the spacers 16, various types can be used that are generally used as spacers for liquid crystal displays; ones made of an inorganic material such as silica, an organic material such as divinyl benzene or the like can be suitably used. The spacers 16 may be sprayed by either a wet method or a dry method. Moreover, any known spacer spraying method may be used such as flexography or disposing spacers by use of a die coater.

Then, the sealing wall 17 made of a resin material is provided at a peripheral part of at least one of the substrates 11a and 11b (see FIG. 2(E)). Any known method such as a screen printing method or a dispenser method may be used. At this time, a port for filling the liquid crystal material 8 is provided as required.

Then, the pair of substrates 11a and 11b are superposed so that the electrode formed surfaces thereof are opposed to each other with the strip-form electrodes 12a and 12b crossing each other, and are bonded together (see FIG. 2(F)).

Then, the liquid crystal material 8 is filled. As the filling method, a known vacuum filling method or a dropping injection method may be used. According to the dropping injection method, after filled, the liquid crystal material 8 is sealed in by hardening the sealing wall 17. When a filling port is provided, the filling port is sealed with an ultraviolet-curing resin or the like after the liquid crystal material is filled.

As the liquid crystal material, as mentioned above, one that exhibits a cholesteric phase in the vicinity of room temperature is used. Here, the liquid crystal material that exhibits a cholesteric phase in the vicinity of room temperature includes not only a cholesteric liquid crystal material but also a chiral nematic liquid crystal material formed by adding a chiral agent to a nematic liquid crystal material. Hereinafter, these will be sometimes collectively called cholesteric liquid crystal materials. Moreover, the substrates may be heated when the liquid crystal material is filled. Since liquid crystal materials exhibiting a cholesteric phase are generally high in viscosity at room temperature, filling is facilitated by heating the substrates when the liquid crystal material is filled. While the substrates may be heated to any given temperature, it is preferable that the temperature be higher than the temperature at which the phase of the liquid crystal material changes to an isotopic phase. By filling the liquid crystal material in the state of an isotropic phase where the liquid crystal material is low in viscosity, filling of liquid crystal is facilitated and the possibility is reduced that a composition distribution of the liquid crystal material occurs within the substrates when the liquid crystal material is filled.

In the case of the dropping injection method, before the pair of substrates 11a and 11b are superposed, the liquid crystal material 8 is dropped onto the electrode formed surface of at least one of the substrates 11a and 11b. For example, various uniform application methods can be used such as dropping the liquid crystal material 8 directly onto the substrate from a bottle, injecting the liquid crystal material 8 through a nozzle, a roll coating method, and a bar coating method.

Figure 3:
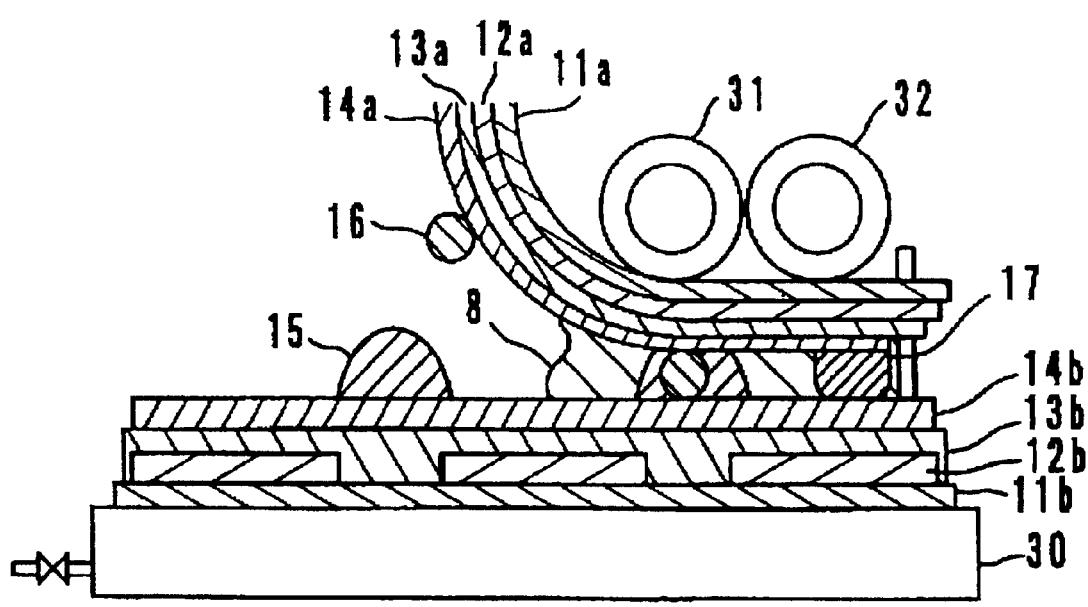
FIG. 3 is an explanatory view showing another process of fabricating the liquid crystal display of FIG. 1.

The liquid crystal material 8 may be filled in the following manner: As shown in FIG. 3, the liquid crystal material 8 is dropped onto an end of one substrate 11b, and an end of the other substrate 11a is placed on the end of the substrate 11b. Then, the liquid crystal material 8 is filled into the entire area of the gap between the substrates 11a and 11b while the substrate 11a is heat-pressed with rollers 31 and 32 toward the other ends of the substrates 11a and 11b so as to be superposed on the substrate 11b. By doing this, the possibility is reduced that bubbles in the liquid crystal material 8 are wrapped in when the substrates 11a and 11b are superposed. The method superposing the substrates and filling the liquid crystal material while pressing the liquid crystal material as described above is particularly effective when resin film substrates are used.

The three kinds of liquid crystal light control layers 1B, 1G and 1R formed by such a method and including the liquid crystal material 8 adjusted so that each liquid crystal light control layer has a different selective reflection wavelength range are stacked so that the closer to the viewing side a liquid crystal light control layer is, the shorter the selective reflection wavelength range reflected by the liquid crystal light control layer is. In this case, the filter layers 91 and 92 are interposed between the liquid crystal light control layers 1B and 1G and between the liquid crystal light control layers 1G and 1R, respectively. The filter layer 91 at least absorbs the color light of the specific wavelength range equivalent to the selective reflection wavelength range of the liquid crystal light control layer 1B, and the transmittance thereof is 10 to 70% in the specific wavelength range. The filter layer 92 at least absorbs the color light of the specific wavelength range equivalent to the selective reflection wavelength range of the liquid crystal light control layer 1G, and the transmittance thereof is 10 to 70% in the specific wavelength range. The filter layers 91 and 92 are not necessarily interposed between the substrates; they may be disposed in any positions that are between adjoining liquid crystal light control layers. Alternatively, the substrates themselves may be colored. The filter layers 91 and 92 may be formed by any means or process such as a screen printing method, a spin coating method, a roll coating method, flexography or a die coating method.

Further, the filter layers are not necessarily formed directly on the substrates 11a and 11b. For example, the filter layers may be formed in such a manner that the filter layers are previously formed on a desired base material and are then transferred onto the substrates included in the liquid crystal display. With this method, the yield at the time of formation of the filter layers improves, so that the filter layers can be formed with efficiency.

Moreover, the black light absorbing layer 10 is provided on the back surface of the lowermost substrate 11b of the display device. The light absorbing layer 10 may be disposed either on the liquid crystal material side of the substrate or on the outside as long as it is disposed on the substrate on the side opposite to the extraneous light incident side. Alternatively, the substrate itself may be colored black. For the light absorbing layer 10, various materials that are capable of absorbing light can be used. The light absorbing layer 10 may be formed by any means or process such as a screen printing method, a spin coating method, a roll coating method, flexography or a die coating method.

The liquid crystal light control layers 1R, 1G and 1B thus formed are stacked so that the closer to the extraneous light incident side (i.e., the viewing side) a liquid crystal light control layer is, the shorter the specific wavelength band reflected by the liquid crystal light control layer is, thereby fabricating a liquid crystal display.

While a simple matrix liquid crystal display has been described in the first embodiment, the present invention is applicable to an active matrix liquid crystal display using an active device such as a thin film transistor (TFT) or a metal insulator metal Hereinafter, further details of the liquid crystal display of the first embodiment will be described with examples 1-1 to 1-5 as examples.

EXAMPLE 1-1

In the example 1-1, a liquid crystal display will be described in which a filter layer absorbing the color light of the specific wavelength range equivalent to the selective reflection wavelength range of the liquid crystal light control layer closer to the extraneous light incident side (the viewing side) is provided and the transmittance of the filter layer is 10 to 70% in the specific wavelength range.

Figure 4:
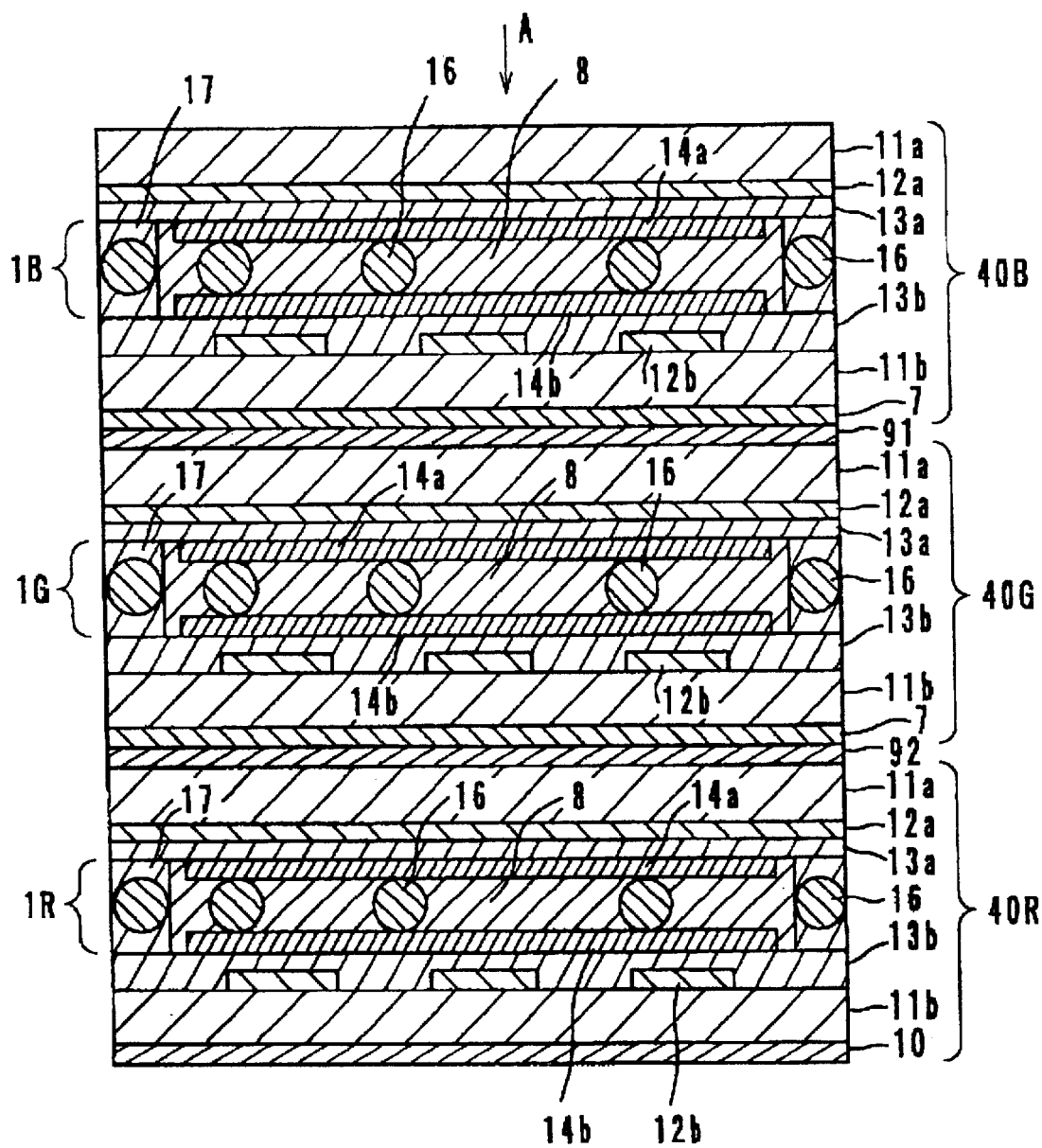
FIG. 4 is a cross-sectional view showing a liquid crystal display fabricated as an example 1-1.

FIG. 4 shows a cross section of the liquid crystal display formed as the example 1-1. The example 1-1 is different from the liquid crystal display shown in FIG. 1 in that adhesive layers 7 are interposed between the blue and green display cells 40B and 40G and between the green and red display cells 40G and 40R, that the resin structures 15 are omitted and that spacers 16 are also mixed in the sealing wall 17.

Figure 5:
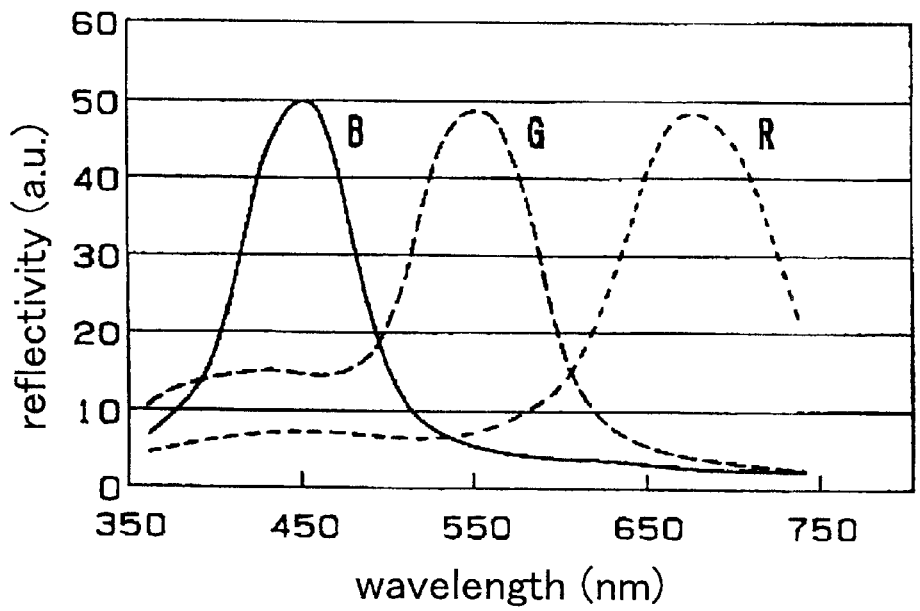
FIG. 5 is a graph showing the spectral reflectances (reflection spectrum) of liquid crystal materials used in the liquid crystal display of the example 1-1.
Figure 6:
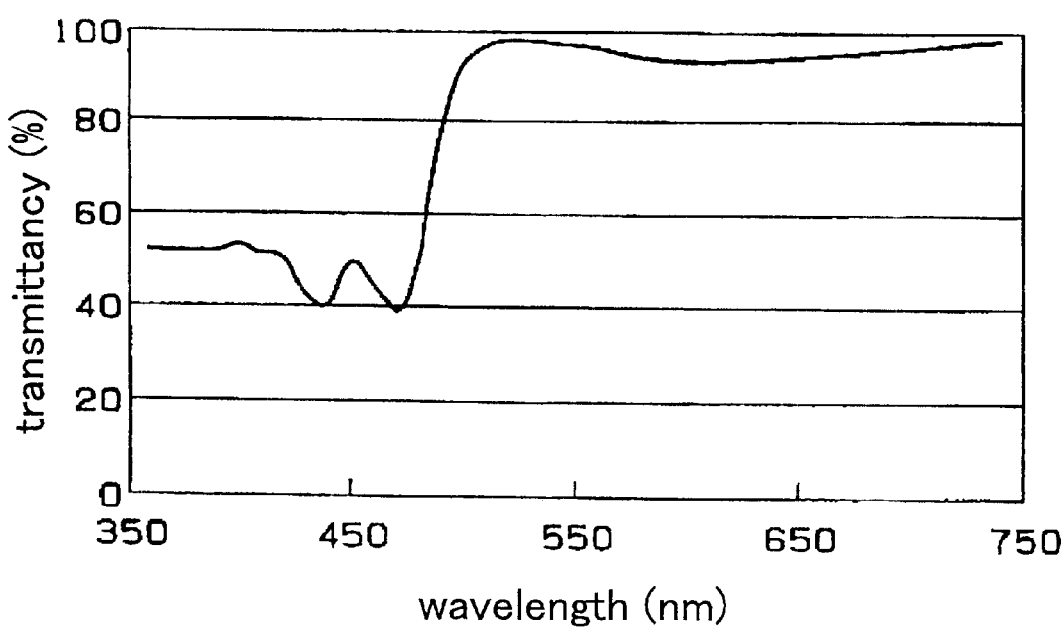
FIG. 6 is a graph showing the transmittance characteristic of a filter layer provided between B and G liquid crystal light control layers in the liquid crystal display of the example 1-1.
Figure 7:
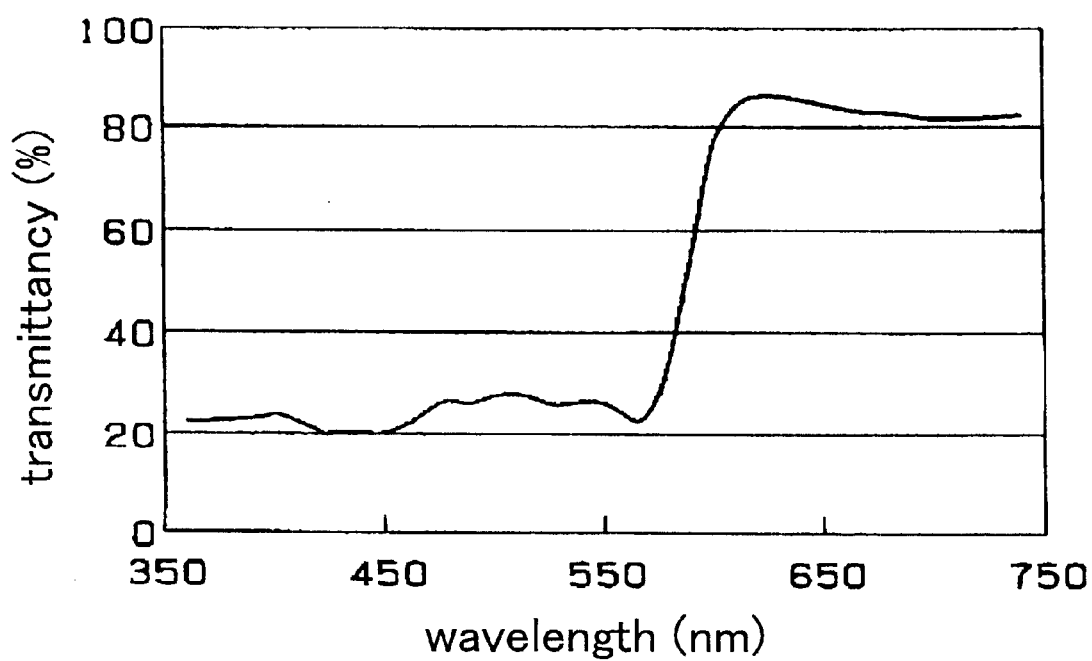
FIG. 7 is a graph showing the transmittance characteristic of a filter layer provided between G and R liquid crystal light control layers in the liquid crystal display of the example 1-1.

In the example 1-1, liquid crystal materials adjusted so that the peak wavelengths of the selective reflections are 450 nm (B), 550 nm (G) and 680 nm (R) are used. Specifically, the spectral reflectances of the liquid crystal materials are adjusted as shown by the curved lines B, G and R in FIG. 5. On the contrary, a filter layer 91 having a transmittance characteristic shown in FIG. 6 is provided between the liquid crystal light control layers 1B and 1G, and a filter layer 92 having a transmittance characteristic shown in FIG. 7 is provided between the liquid crystal light control layers 1G and 1R.

Here, the liquid crystal light control layers on the extraneous light incident side (the viewing side) of the filter layers 91 and 92 are B and G reflecting layers, respectively. When the specific wavelength ranges selectively reflected by these two layers are ranges up to where the reflectance is half the peak selective reflection wavelength (the half width of the reflection spectrum), the specific wavelength ranges of the liquid crystal light control layers 1B and 1G are 410 to 485 nm and 505 to 595 nm, respectively. Therefore, as the filter layer 91 disposed between the liquid crystal light control layers 1B and 1G, one was used whose transmittance was 10 to 70% at least in the wavelength range of 410 to 485 nm, and as the filter layer 92 disposed between the liquid crystal light control layers 1G and 1R, one was used whose transmittance was 10 to 70% at least in the wavelength range of 505 to 595 nm.

Next, a process of forming the example 1-1 will be described with reference to FIGS. 8(A) to 8(F).

First, a method of forming the liquid crystal cell 40R including the liquid crystal light control layer 1R will be described. For the substrates 11a and 11b, 7059 glass (available from Corning Incorporated) with a thickness of 0.75 mm was used. The filter layer 92 was formed on the substrate 11a, and the light absorbing layer 10 was formed on the substrate 11b (see FIGS. 8(A) and 8(A')). The filter layer 92 and the light absorbing layer 10 are formed in the following manner:

For the filter layer, a red pigment dispersed resist (CR-7001, available from Fujifilm Olin Co. Ltd.) was applied onto the substrate 11a in a thickness of 600 nm by a spin coating method. For the light absorbing layer, a black pigment dispersed resist (CFPR BK-730S T-4, available from Tokyo Ohka Kogyo Co., Ltd.) was applied onto the substrate 11b in a thickness of 1.2 μm by a spin coating method. After the application, the substrates were baked at 200° to form the filter layer 92 and the light absorbing layer 10.

Then, an ITO thin film with a thickness of 70 nm was formed on each of the substrates 11a and 11b by a sputtering method. For both of the substrates 11a and 11b, ITO was sputtered on the side opposite to the previously formed filter layer 92 and light absorbing layer 10. Then, the strip-form transparent electrodes 12a and 12b with a width of 280 μm were formed at intervals of 20 μm by photolithography (see FIGS. 8(B) and 8(B')).

Then, the insulating films 13a and 13b were formed (see FIGS. 8(C) and 8(C')). The insulating films were formed in a thickness of 100 nm by a spin coating method by use of a poly silazane solution (L110, available from Tonen Corp.), and were heated for two hours in a constant temperature bath of 250°. Then, as the alignment layers 14a and 14b, AL4552 (available from JSR Corp.) was applied in a thickness of 50 nm by a spin coating method and was heated at 180° for one hour in a constant temperature bath (see FIGS. 8(D) and 8(D')).

Then, as shown in FIG. 8(E), the spacers 16 (MICROPEARL SP-207, available from Sekisui Finechemical Co., Ltd.) with a diameter of 7 μm were sprayed onto the substrate 11a. The spacers 16 were dispersed in a solvent of water and isopropanol of a volume ratio of 8 to 2, and sprayed onto the substrate 11a from a spray bottle. Further, on the substrate 11a, an end-sealing material (Struct Bond XN-21-S, available from Mitsui Toatsu Co., Ltd.) in which spacers 16 (MICROPEARL SP-207) with a diameter of 7 μm were mixed was applied onto a peripheral part of the substrate 11a by use of an end-sealing material applying apparatus (MLC-III, available from Musashi Engineering, Inc.), thereby forming the sealing wall 17. At this time, a port for filling the liquid crystal material was formed. The substrates 11a and 11b were superposed so that the electrode formed surfaces thereof were opposed to each other (see FIG. 8(F)). At this time, the substrates 11a and 11b were superposed so that the strip-form electrodes 12a and 12b are orthogonal to each other.

The superposed substrates 11a and 11b were sandwiched between surface-polished flat substrates made of stainless steel, and after a load of 0.3 kg/cm$^2$ was imposed from above the stainless steel flat substrates, the substrates 11a and 11b were left in a constant temperature bath of 150° for 90 minutes, thereby bonding the substrates 11a and 11b together. Then, the constant temperature bath was powered off, and the substrates 11a and 11b were cooled to room temperature in the constant temperature bath with the load being imposed thereon.

Then, the liquid crystal material 8 was filled. As the liquid crystal material, E44 containing 30 wt % of a chiral agent CB15 (both available from Merk & Co.) was used, and the liquid crystal material was filled by a known vacuum filling method. After the liquid crystal material 8 is filled, an ultraviolet-curing resin (Photolec A-704-60, available from Sekisui Finechemical Co., Ltd.) was applied to the filling port, and ultraviolet rays were applied to seal the port.

The liquid crystal cells 40G and 40B including the liquid crystal light control layers 1G and 1B, respectively, were also formed in the same manner. For the liquid crystal light control layer 1G, E44 containing 40 wt % of the chiral agent CB15 (both available from Merk & Co.) was used as the liquid crystal material. In the liquid crystal cell 40G including the liquid crystal light control layer 1G, the light absorbing layer was not formed and the filter layer 91 was formed by use of a yellow pigment dispersed resist (CY-S639, available from Fujifilm Olin Co., Ltd.). For the liquid crystal light control layer 1B, E44 containing 50 wt % of the chiral agent CB15 (both available from Merk & Co.) was used as the liquid crystal material. In the liquid crystal cell 40B including the liquid crystal light control layer 1B, neither the light absorbing layer nor the filter layer was formed.

Then, the liquid crystal cells 40R, 40G and 40B including the liquid crystal light control layers 1R, 1G and 1B, respectively, were stacked. The substrate 11b of the liquid crystal cell 40G where no filter layer was formed was superposed on the filter layer 92 of the liquid crystal cell 40R, and the liquid crystal cell 40B was superposed on the filter layer 91 of the liquid crystal cell 40G. An antireflection film or the like may be provided on the extraneous light incident side of the liquid crystal cell 40B. Between the liquid crystal cells 40R and 40G and between the liquid crystal cells 40G and 40B, an appropriate amount of a mixture of thermosetting resins SE1885A and SE1885B (both available from Dow Corning Toray Silicone Co., Ltd.) at a ratio of 1 to 1 was applied (the adhesive layers 7), and the liquid crystal cells 40R, 40G and 40B were bonded by being left at 50□ for four hours in a constant temperature bath.

In this manner, the cholesteric liquid crystal display was fabricated. The fabricated device was high in contrast and the display on the screen could be clearly viewed.

EXAMPLE 1-2

In the example 1-2, flexible film substrates are used in the liquid crystal display of the first embodiment. The device structure is the same as that of the first embodiment except that instead of glass substrates, resin film substrates with ITO films are used as the substrates 11a and 11b.

The part of a method of fabricating this device which part is different from the fabricating method of the example 1-1 will be described.

First, a method of forming the liquid crystal cell 40R including the liquid crystal light control layer 1R will be described. As the film substrates 11a and 11b with ITO films, polyether sulfone (PES) substrates with a thickness of 0.1 mm (Sumilite FST5352, available from Sumitomo Bakelite Co., Ltd.) were used. The red filter layer and the light absorbing layer were formed on the surfaces of the substrates opposite to the ITO film formed surfaces by a similar method to that of the example 1-1 by use of similar materials as those of the example 1-1.

Then, the ITO films were processed by photolithography to form a plurality of strip-form electrodes 12a and 12b with a width of 280 μm at intervals of 20 μm. Then, like in the example 1-1, the insulating films and the alignment layers were formed, the spacers were sprayed, the sealing wall 17 was disposed, the substrates were bonded together, and then, the liquid crystal material was filled by a vacuum filling method.

In the liquid crystal cell 40G including the liquid crystal light control layer 1G, the same yellow filter layer 91 as that of the example 1-1 was provided on the outside of the substrate, and the light absorbing layer was not provided. In the liquid crystal cell 40B including the liquid crystal light control layer 1B, neither the filter layer nor the light absorbing layer was provided like in the example 1-1.

The liquid crystal cells 40R, 40G and 40B including the liquid crystal light control layers 1R, 1G and 1B, respectively, were stacked by a similar method to that of the example 1-1 to fabricate the cholesteric liquid crystal display.

The liquid crystal display thus fabricated was light in weight because the substrates were made of resin films. Moreover, since the liquid crystal display was thin, the stacking of the liquid crystal cells hardly decreased the reflectance, so that bright display could be provided.

EXAMPLE 1-3

Figure 9:
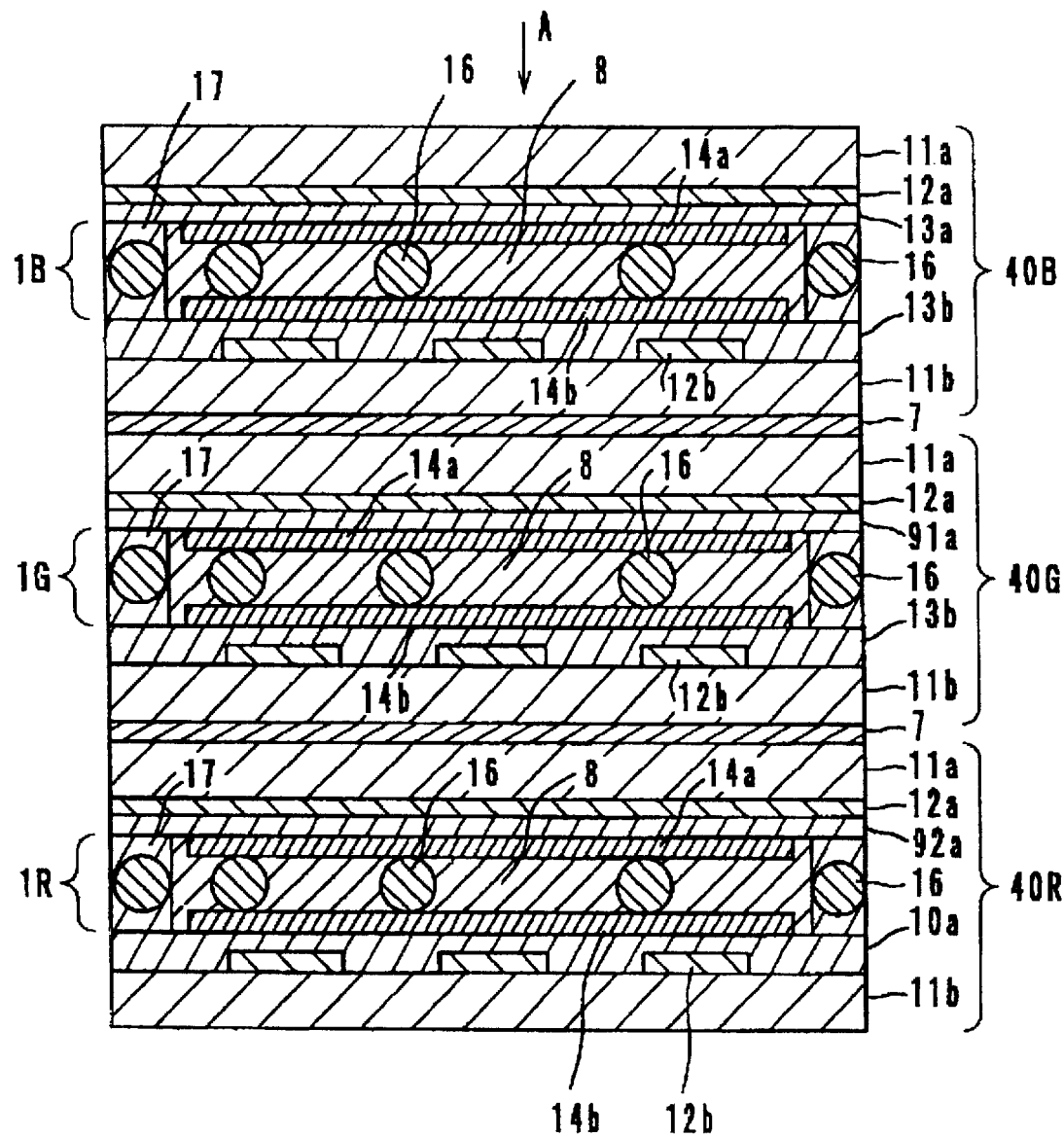
FIG. 9 is a cross-sectional view showing a liquid crystal display fabricated as an example 1-3.

In the example 1-3, the filter layers are provided on the sides of the substrates which are in contact with the liquid crystal material. The liquid crystal display fabricated as the example 1-3 was similar to the example 1-2 in that film substrates were used; however, as shown in FIG. 9, filter layers similar to those of the example 1-1 were provided instead of the insulating films of the example 1-1, and the filter layers 91a and 92b functioned also as insulating films. Moreover, instead of the other insulating layer of the liquid crystal cell 40R, a light absorbing layer similar to that of the example 1-1 was provided, and the light absorbing layer 10a functioned also as an insulating layer. Except these, the structure was similar to that of the example 1-2.

The part of a fabricating method which is different from the fabricating method of the example 1-2 will be described.

First, a method of forming the liquid crystal cell 40R including the liquid crystal light control layer 1R will be described with reference to FIGS. 10(A) to 10E). As the film substrates 11a and 11b with ITO films, polyether sulfone (PES) substrates with a thickness of 0.1 mm (Sumilite FST5352) were used. The ITO films were processed by photolithography to form a plurality of strip-form electrodes 12a and 12b with a width of 280 μm at intervals of 20 μm (see FIGS. 10(A) and 10(A')).

Then, the red filter layer 92a and the light absorbing layer 10a were formed on the electrode formed surfaces of the substrates 11a and 11b (see FIGS. 10(B) and 10(B')). In this example, the light absorbing layer 10a was also provided on the liquid crystal material side of the substrate 11b. In this case, the light absorbing layer 10a can be used also as the other insulating layer. However, it is not necessary that both of the filter layers 92a and the light absorbing layer 10a be provided on the liquid crystal material sides of the substrates 11a and 11b; it is necessary only that at least the red filter layer 92a be provided on the liquid crystal material side of the substrate.

In the liquid crystal cell 40G including the liquid crystal light control layer 1G, the same yellow filter layer 91a as that of the example 1-1 was provided on the liquid crystal material side of the substrate 11a, and the light absorbing layer was not provided (see FIG. 10(D)). In the liquid crystal cell 40B including the liquid crystal light control layer 1B, neither the filter layer nor the light absorbing layer was provided like in the example 1-1 (see FIG. 10(E)).

The liquid crystal cells 40R, 40G and 40B including the liquid crystal light control layers 1R, 1G and 1B, respectively, were stacked by a similar method to that of the example 1-1 to fabricate the cholesteric liquid crystal display.

In the liquid crystal display thus fabricated, since the filter layers can be used also as the insulating layers, the number of parts can be reduced, so that the cost of manufacturing can be reduced. Moreover, since scattering components of the reflected light can be cut before the reflected light passes through the substrates which are the thickest of all the parts, reduction in contrast due to an increase in scattering components caused when the reflected light passes through the substrates can be suppressed.

EXAMPLE 1-4

In the example 1-4, the filter layers are provided between the substrates and the strip-form electrodes on the sides of the substrates which are in contact with the liquid crystal material.

Figure 11:
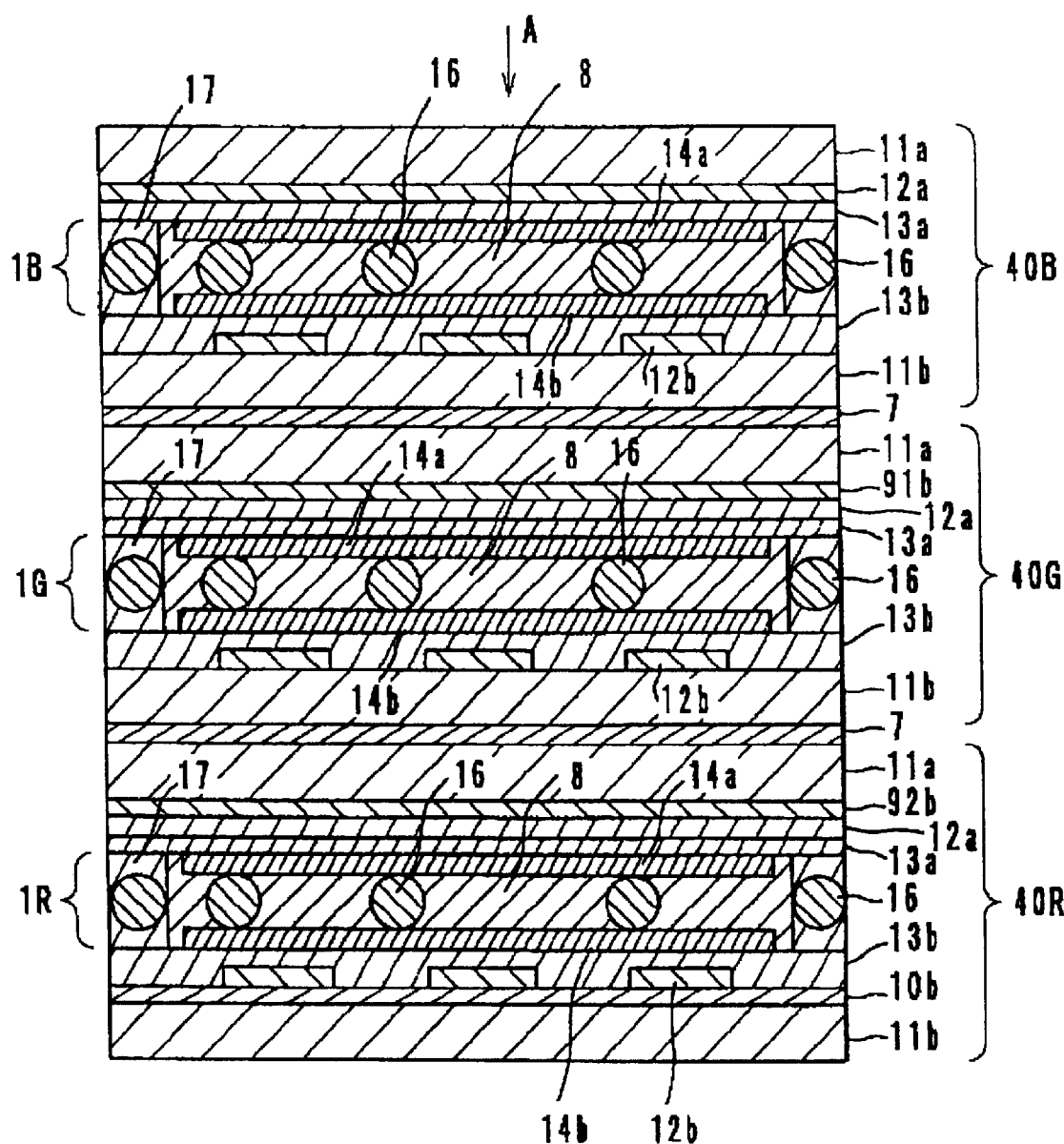
FIG. 11 is a cross-sectional view showing a liquid crystal display fabricated as an example 1-4.

The liquid crystal display fabricated as the example 1-4 was similar to the example 1-1 in that glass substrates were used; however, as shown in FIG. 11, filter layers 91b and 92b were provided on the substrates 11a of the liquid crystal cells 40G and 40R, and a light absorbing layer 10b was provided on the substrate 11b of the liquid crystal cell 40R. Except these, the structure is the same as that of the example 1-1.

The part of a fabricating method which is different from the fabricating method of the example 1-1 will be described.

First, a method of forming the liquid crystal cell 40R including the liquid crystal light control layer 1R will be described with reference to FIGS. 12(A) to 12(E). The red filter layer 92b and the light absorbing layer 10b were formed on the transparent 7059 glass substrates 11a and 11b by a similar method to that of the example 1-1 (see FIGS. 12(A) and (A')). Then, an ITO film with a thickness of 100 nm was formed on each of the filter layer 92b and the light absorbing layer 10b by a sputtering method. The ITO films were processed by photolithography to pattern the ITO film, thereby forming a plurality of strip-form electrodes 12a and 12b with a width of 280 μm at intervals of 20 μm (see FIGS. 12(B) and 12(13')). The succeeding steps were similar to those of the example 1-1.

In the liquid crystal cell 40G including the liquid crystal light control layer 1G, the same yellow filter layer 91b as that of the example 1-1 was provided between the substrate 11a and the strip-form electrodes 12a, and the light absorbing layer was not provided (see FIG. 12(D)). In the liquid crystal cell 40B including the liquid crystal light control layer 1B, neither the filter layer nor the light absorbing layer was provided like in the example 1-1 (see FIG. 12(E)).

The liquid crystal cells 40R, 40G and 40B including the liquid crystal light control layers 1R, 1G and 1B, respectively, were stacked by a similar method to that of the example 1-1 to fabricate the cholesteric liquid crystal display.

In the liquid crystal display thus fabricated, scattering components of the reflected light can be cut before the reflected light passes through the substrates which are the thickest of all the parts. Consequently, reduction in contrast due to an increase in scattering components caused when the reflected light passes through the substrates can be suppressed. Further, since there is no loss of the voltage applied to the liquid crystal material due to the filter layers provided on the electrodes, the liquid crystal material can be driven at a low voltage.

While the light absorbing layer 10b is also provided between the substrate 11b and the strip-form electrodes 12b in the example 1-4, this is not an absolute necessity. Formation of the light absorbing layer 10b on the outside surface of the substrate 11b does not exert a large influence as a factor that increases scattering components of the reflected light.

EXAMPLE 1-5

In the example 1-5, resin structures for bonding and supporting a pair of opposing substrates are disposed in desired positions within the display areas of the liquid crystal light control layers.

Figure 13:
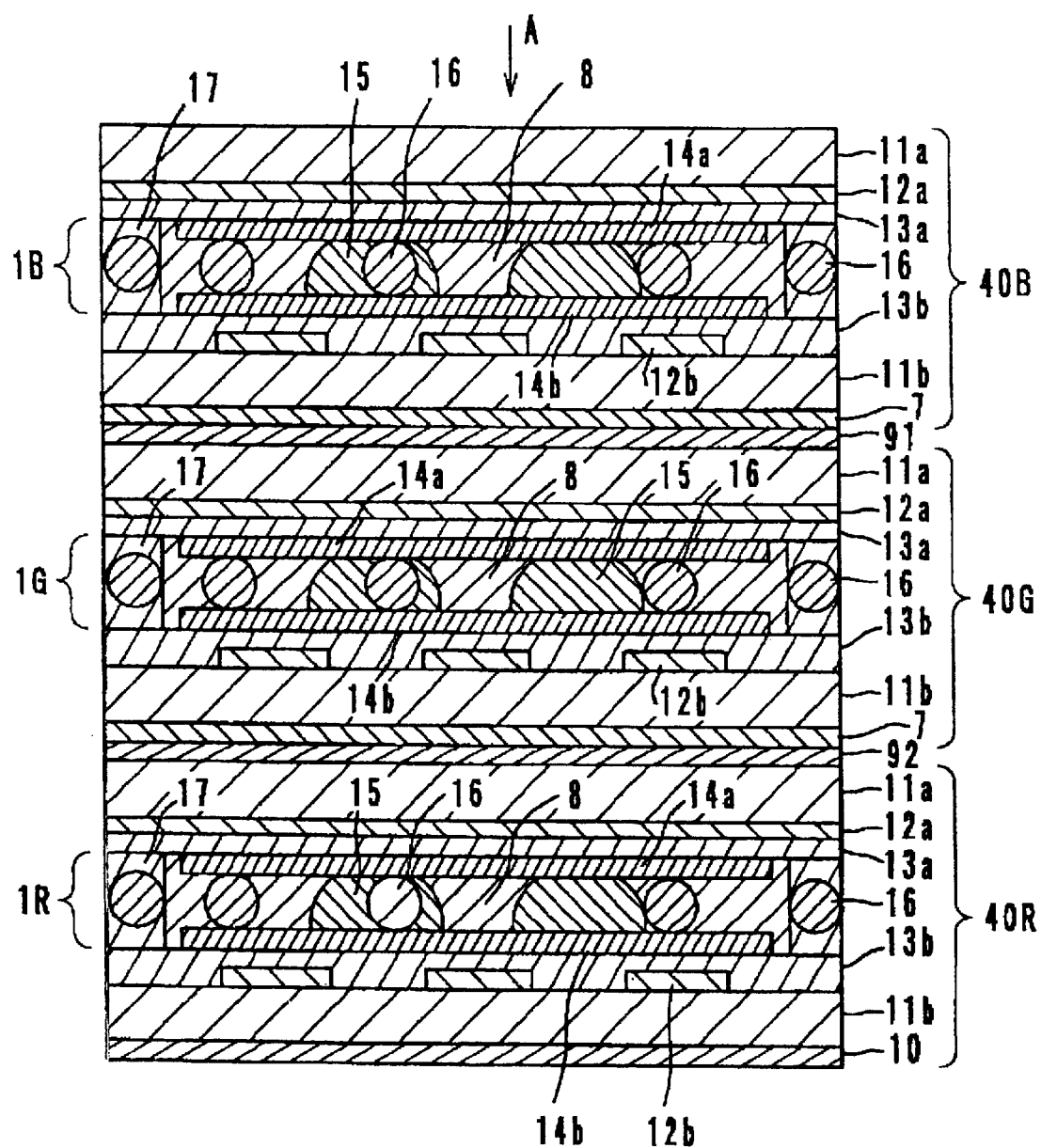
FIG. 13 is a cross-sectional view showing a liquid crystal display fabricated as an example 1-5.

The structure of the liquid crystal display fabricated as the example 1-5 is similar to that of the example 1-2 except that the resin structures 15 are provided in the liquid crystal light control layers 1R, 1G and 1B as shown in FIG. 13.

The part of a fabricating method which is different from the fabricating method of the example 1-2 will be described.

First, a method of forming the liquid crystal cell 40R (FIG. 14(c)) including the liquid crystal light control layer 1R will be described with reference to FIGS. 14(A) to 14(E). The steps of forming the strip form electrodes 12a and 12b, the insulating films 13a and 13b and the alignment layers 14a and 14b on the PES substrates (Sumilite FST5352) 11a and 11b with ITO films with a thickness of 0.1 mm are similar to those of the example 1-2 (see FIGS. 14(A) and (A')).

Then, the resin structures 15 were formed on the alignment layer 14b of the substrate 11b by use of a screen plate (see FIG. 14(B')). As the screen plate, an MS-Docket ER plate MS-290B (available from Murakami Co., Ltd.) of an oil repellent specification was used. A resin transmitting portion was 50 μm in diameter, 200 μm in pitch and 35 μm in thickness. In printing, by use of a screen printer MT320TV (available from Microtek Inc.), a thermoplastic resin STAYSTIK 371 (available from Techno Alpha Co., Ltd.) was printed. Consequently, the printed resin structures 15 were 60 μm in diameter, 200 μm in pitch and 8 μm in height.

On the other hand, as shown in FIG. 14(B), the same spacers 16 as those of the example 1-1 were sprayed onto the alignment layer 14a of the substrate 11a, the same end-sealing material as that of the example 1-1 was applied to form the sealing wall 17, and the pair of substrates 11a and 11b were bonded together by a similar method. The succeeding steps were similar to those of the example 1-2.

In the liquid crystal cell 40G including the liquid crystal light control layer 1G, the same yellow filter layer 91 as that of the example 1-1 was provided, and the light absorbing layer was not provided (see FIG. 14(D)). In the liquid crystal cell 40B including the liquid crystal light control layer 1B, neither the filter layer nor the light absorbing layer was provided like in the example 1-1 (see FIG. 14(E)).

The liquid crystal cells 40R, 40G and 40B including the liquid crystal light control layers 1R, 1G and 1B, respectively, were stacked by a similar method to that of the example 1-1 to fabricate the cholesteric liquid crystal display.

In the liquid crystal display thus fabricated, the substrate-to-substrate gaps were uniform and display unevenness was extremely small.

EXAMPLE 1-6

In the example 1-6, resin coated spacers were used as the spacers 16. Resin coated spacers, which are formed by coating normal spacers with a resin such as a thermoplastic resin or a polymerizable resin, were fixed onto the substrates through the coating resin by heating or application of light after sprayed onto the substrate.

The structure of the liquid crystal display fabricated as the example 1-6 is the same as that of the example 1-2 except that the resin coated spacers fixed onto the surfaces of the substrates were used as the spacers that define the substrate-to-substrate gaps.

The part of a fabricating method which is different from the fabricating method of the example 1-2 will be described.

A method of forming the liquid crystal cell 40R including the liquid crystal light control layer 1R will be described. The steps of forming the electrodes 12a and 12b, the insulating films 13a and 13b and the alignment layers 14a and 14b on the PES substrates (Sumilite FST5352) 11a and 11b with ITO films with dimensions of 300×200×0.1 mm are similar to those of the example 1-2.

Then, the resin coated spacers (HIPRESICA N3M14, available from Ube-Nitto Kasei Co., Ltd.) 16 with an average diameter of 7 μm were sprayed onto the alignment layer 14b of the substrate 11b by use of a wet spacer sprayer SEC-SPM-N1 (available from SE Corp.). After the spacers 16 were sprayed, the substrate 11b was heated at 150□ for 90 minutes in a constant temperature bath to fix the spacers 16 onto the substrate 11b.

Then, the same end-sealing material as that of the example 1-1 was applied onto the substrate 11b to form the sealing wall 17, and the pair of substrates 11a and 11b were bonded together by a similar method. The succeeding steps were similar to those of the example 1-2.

In the liquid crystal cell 40G including the liquid crystal light control layer 1G, the same yellow filter layer 91 as that of the example 1-1 was provided, and the light absorbing layer was not provided. In the liquid crystal cell 40B including the liquid crystal light control layer 1B, neither the filter layer nor the light absorbing layer was provided like in the example 1-1.

The liquid crystal cells 40R, 40G and 40B including the liquid crystal light control layers 1R, 1G and 1B, respectively, were stacked by a similar method to that of the example 1-1 to fabricate the cholesteric liquid crystal display.

Although the liquid crystal display thus fabricated was a device using large-size substrates, the substrate-to-substrate gaps were uniform, and display unevenness was small even after a lapse of a long time.

(Second Embodiment)

In the second embodiment, a liquid crystal display using cholesteric liquid crystal will be described.

The filter layers used in the second embodiment have the following characteristics. That is, each of the filter layers of this embodiment absorbs light components in the range of wavelengths shorter than the selective reflection wavelength range of the liquid crystal light control layer far from the extraneous light incident side (the viewing side). Specifically, each of the filters has a light absorbing characteristic in at least a shorter wavelength range from the peak wavelength of the selective reflection range of the liquid crystal light control layer far from the extraneous light incident side to 1.3 to 1.5 times the half width of the selective reflection. The transmittance of the filter layers in the shorter wavelength range is 10 to 70%.

The liquid crystal display fabricated according to the second embodiment is similar to the first embodiment except that the filter layers have the above-mentioned configuration.

Figure 15:
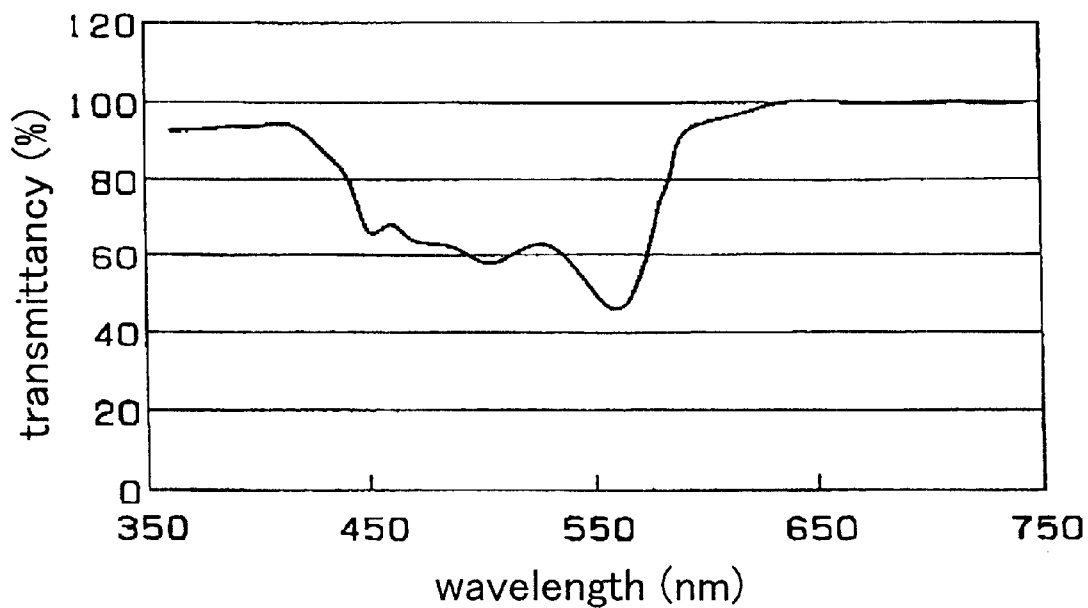
FIG. 15 is a graph showing the transmittance characteristic of a filter layer provided between G and R liquid crystal light control layers in a liquid crystal display according to a second embodiment of the present invention.
Figure 16:
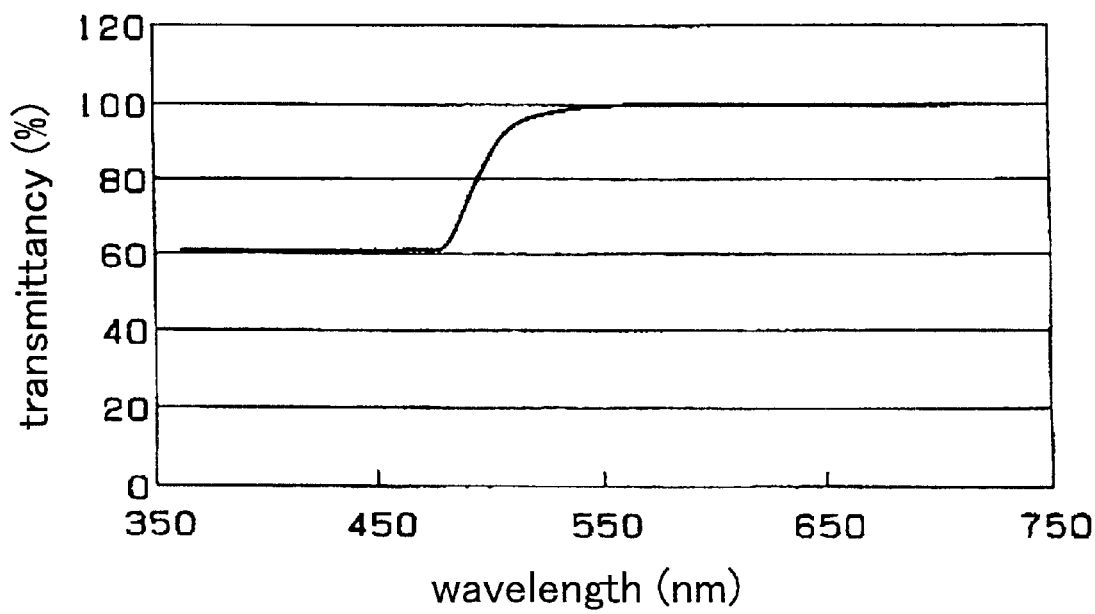
FIG. 16 is a graph showing the transmittance characteristic of a filter layer provided between B and G liquid crystal light control layers in the liquid crystal display according to the second embodiment of the present invention.

For example, when the liquid crystal material shown in the first embodiment (any one of the examples 1-1 to 1-5) is used, it is necessary for the transmittance characteristics of the filter layers used in the second embodiment only to be as shown in FIGS. 15 and 16. FIG. 15 shows the characteristic of the filter layer 92 disposed between the liquid crystal light control layers 1G and 1R. FIG. 16 shows the characteristic of the filter layer 91 disposed between the liquid crystal light control layers 1B and 1G.

The filter layers having such transmittance characteristics can be realized, for example, by use of the following materials: The filter layer provided between the liquid crystal light control layers 1G and 1R can be realized by use of CRY-S747 available from Fujifilm Olin Co., Ltd. The filter layer provided between the liquid crystal light control layers 1B and 1G can be realized by CFPR Y-100 available from Tokyo Ohka Kogyo Co., Ltd.

The method of fabricating the liquid crystal display according to the second embodiment and the method of forming the filter layers are similar to those of the examples 1-1 to 1-6 of the first embodiment.

In the fabricated liquid crystal display, reduction in contrast and reduction in viewing angle were suppressed.

(Third Embodiment)

In the third embodiment, a liquid crystal display using cholesteric liquid crystal will be described.

The filter layers used in the second embodiment have the following characteristics. That is, each of the filter layers of this embodiment absorbs light components in the range of wavelengths shorter than the selective reflection wavelength range of the liquid crystal light control layer far from the extraneous light incident side. Specifically, each of the filter layers absorbs light components in a shorter wavelength range of 100 to 150 nm from the peak wavelength of the selective reflection wavelength range of the liquid crystal light control layer far from the extraneous light incident side, and the transmittance of the filter layers in the shorter wavelength range is 10 to 70%.

The liquid crystal display fabricated according to the third embodiment is similar to the first embodiment except that the filter layers have the above-mentioned configuration.

Figure 17:
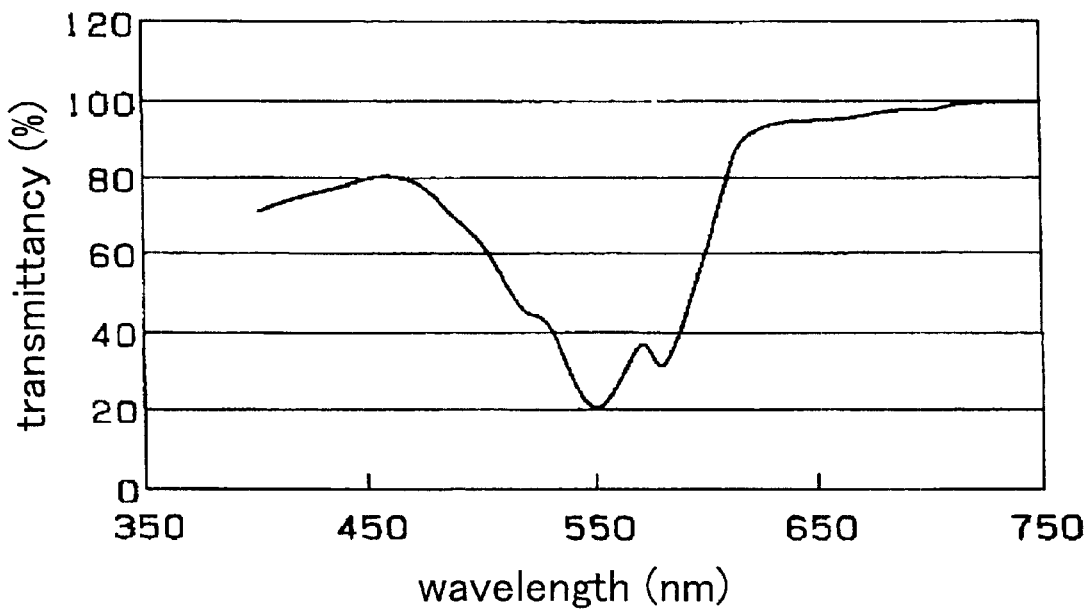
FIG. 17 is a graph showing the transmittance characteristic of a filter layer provided between G and R liquid crystal light control layers in a liquid crystal display according to a third embodiment of the present invention.
Figure 18:
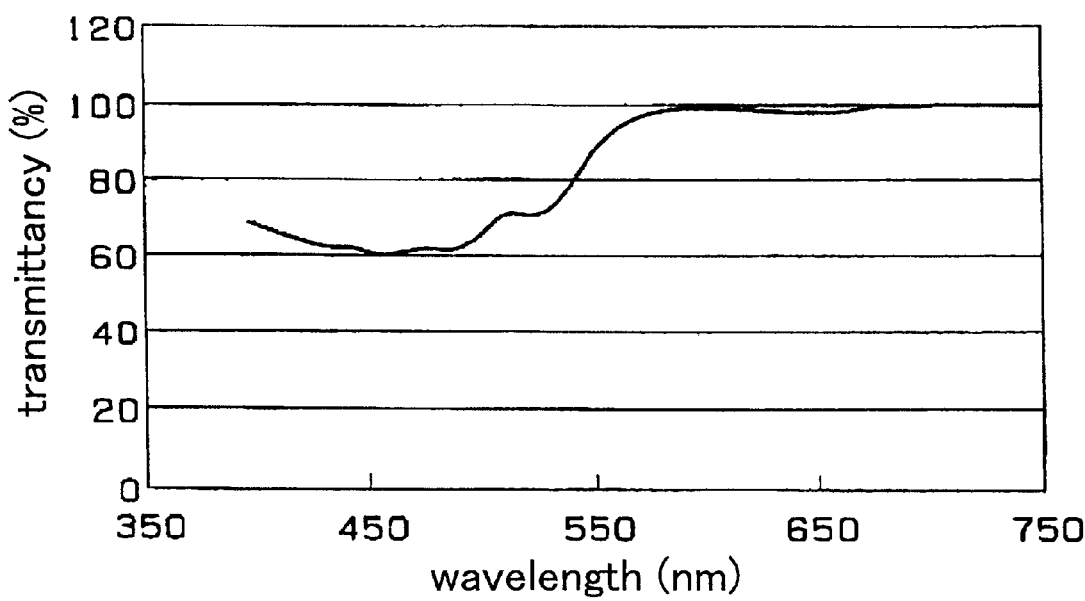
FIG. 18 is a graph showing the transmittance characteristic of a filter layer provided between B and G liquid crystal light control layers in the liquid crystal display according to the third embodiment of the present invention.

For example, when the liquid crystal material shown in the first embodiment (any one of the examples 1-1 to 1-5) is used, it is necessary for the transmittance characteristics of the filter layer used in the third embodiment only to be as shown in FIGS. 17 and 18. FIG. 17 shows the characteristic of the filter layer 92 disposed between the liquid crystal light control layers 1G and 1R. FIG. 18 shows the characteristic of the filter layer 91 disposed between the liquid crystal light control layers 1B and 1G.

The filter layers having such transmittance characteristics can be realized, for example, by use of the following materials: The filter layer provided between the liquid crystal light control layers 1G and 1R can be realized by use of CRY-S778 available from Fujifilm Olin Co., Ltd. The filter layer provided between the liquid crystal light control layers 1B and 1G can be realized by CY-565 available from Fujifilm Olin Co., Ltd.

The method of fabricating the liquid crystal display according to the third embodiment and the method of forming the filter layers are similar to those of the examples 1-1 to 1-6 of the first embodiment.

In the fabricated liquid crystal display, reduction in viewing angle and reduction in the brightness of the display screen were suppressed.

Comparative Example 1

In the comparative example 1, a liquid crystal display using filter layers that have conventional spectral transmittance characteristics will be described. While the structure of the device is similar to that of the first embodiment, as the filter layer disposed between the liquid crystal light control layers 1G and 1R, one having the transmittance characteristic shown in FIG. 19 was used, and as the filter layer disposed between the liquid crystal light control layers 1B and 1G, one having the transmittance characteristic shown in FIG. 20 was used.

Figure 19:
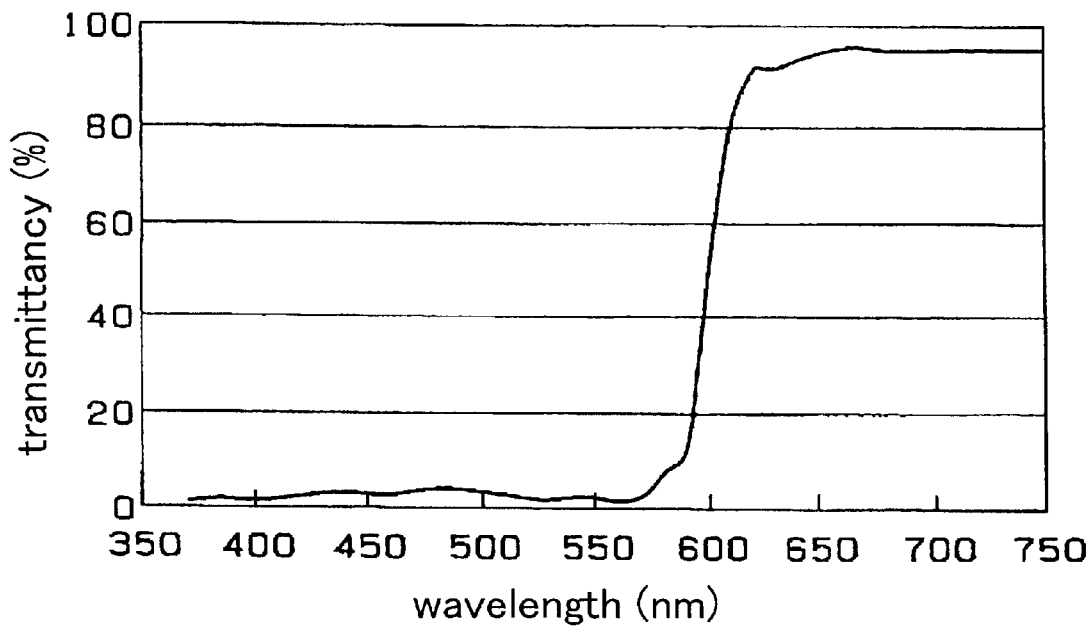
FIG. 19 is a graph showing the transmittance characteristic of a filter layer provided between G and R liquid crystal light control layers in a liquid crystal display according to a first comparative example.
Figure 20:
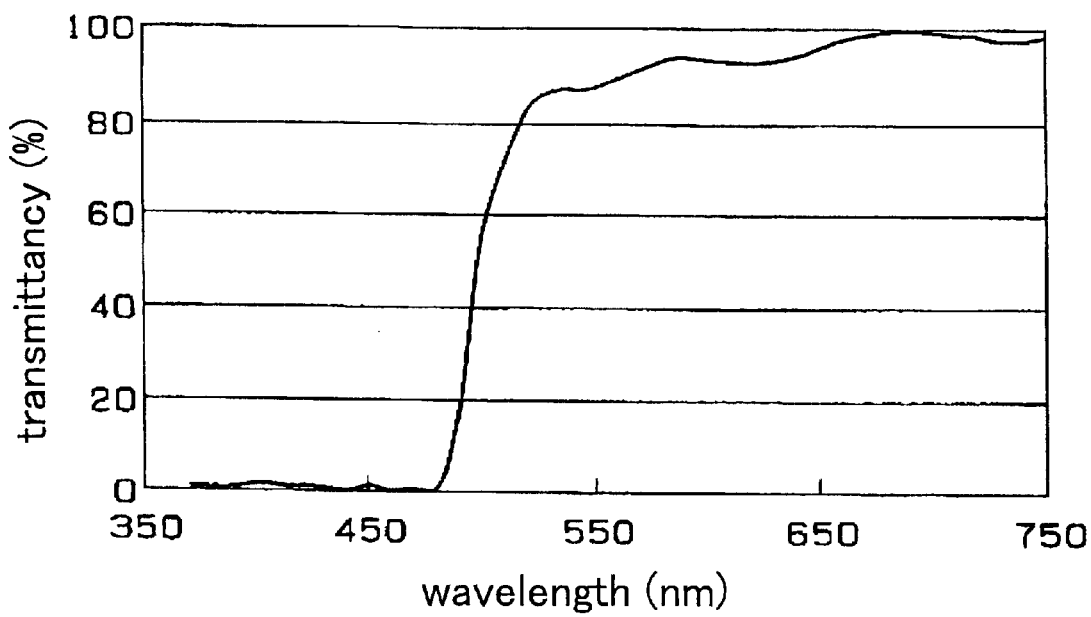
FIG. 20 is a graph showing the transmittance characteristic of a filter layer provided between B and G liquid crystal light control layers in the liquid crystal display according to the first comparative example.

As is apparent from FIGS. 19 and 20, the spectral characteristics of both of the filter layers are such that the transmittance is less than 10% in the selective reflection wavelength range of the liquid crystal light control layer situated on the extraneous light incident side, that the transmittance is less than 10% in a shorter wavelength region from the selective reflection wavelength range of the liquid crystal light control layer far from the extraneous light incident side to 1.3 to 1.5 times the half width of the peak wavelength of the reflection spectrum and that the transmittance is less than 10% in a shorter wavelength region of 120 to 150 nm from the peak wavelength of the reflection spectrum of the liquid crystal light control layer far from the extraneous light incident side. The device fabricating method was similar to that of the example 1-1.

The viewing angle characteristic of the fabricated liquid crystal display was evaluated by measuring the contrast at each viewing angle. The result of the measurement is shown in TABLE 1.

TABLE I

| Viewing angle | 0° | 50° |
|---|---|---|
| Example 1–1 | 7 | 5 |
| Comparative Example 1 | 6 | 3.5 |

As shown in TABLE 1, in the liquid crystal display of the comparative example 1, reduction in contrast is significant particularly when the display screen is viewed from a slanting direction. To measure the contrast, incident light was applied to the device from a direction slanting 20 degrees from the normal, the intensity of the light reflected from the device was measured at positions 0 and 50 degrees from the direction of the normal for each of the case of displaying black and the case of displaying white, and the ratio therebetween was obtained.

It is to be understood that the liquid crystal displays according to the first to third embodiments are not limited to the specific configurations described above and various modifications are possible within the scope of the invention.

(Fourth Embodiment)

Next, a fourth embodiment of the present invention will be described with reference to the drawings. A multilayer liquid crystal display E1 shown in FIG. 21 has three display cells 101, 102 and 103. The display cells 101, 102 and 103 are stacked in this order. In the multilayer liquid crystal display E1, the display screen is viewed from above the display cell 101 disposed on the uppermost side in FIG. 21.

In this example, the display cells 101, 102 and 103 are for displaying blue, green and red, respectively.

The blue display cell 101 has transparent substrates 111 and 112 having transparent electrodes 113 and 114 formed thereon, respectively, and a liquid crystal light control layer 115 sandwiched between the substrates 111 and 112. On the viewing side of the substrate 111, a filter layer (light control layer) 116 is provided.

The green display cell 102 has transparent substrates 121 and 122 having transparent electrodes 123 and 124 formed thereon, respectively, and a liquid crystal light control layer 125 sandwiched between the substrates. On the viewing side of the substrate 121, a filter layer 126 is provided.

The red display cell 103 has transparent substrates 131 and 132 having transparent electrodes 133 and 134 formed thereon, respectively, and a liquid crystal light control layer 135 sandwiched between the substrates. On the viewing side of the substrate 131, a filter layer 136 is provided.

In this embodiment, by stacking the display cells 101, 102 and 103 in this order from the viewing side, the liquid crystal light control layers 115, 125 and 135 are stacked in this order.

In this embodiment, the liquid crystal light control layers 115, 125 and 135 all include chiral nematic liquid crystal formed by adding a chiral agent to nematic liquid crystal so that a desired helical pitch is obtained. Although not shown, the liquid crystal light control layers 115, 125 and 135 all include spherical spacers for controlling the substrate-to-substrate distance, in other words, for controlling the thickness of the liquid crystal light control layers (liquid crystal thickness). The liquid crystal light control layer 115 has the peak wavelength of the selective reflection range of blue. The liquid crystal light control layer 125 has the peak wavelength of the selective reflection wavelength range of green. The liquid crystal light control layer 135 has the peak wavelength of the selective reflection wavelength range red. That is, the liquid crystal light control layers 115, 125 and 135 are for displaying blue, green and red, respectively.

On the side of the red display cell 103 opposite to the viewing side, a black light absorber 104 is disposed. In the multilayer liquid crystal display E1, full color display can be provided by controlling the voltages applied between the electrodes of the display cells.

In the multilayer liquid crystal display E1 of the present embodiment, the selective reflection wavelengths (the peak wavelengths of the selective reflection wavelength ranges), the half widths of the selective reflection wavelength ranges of the reflection spectrums and the maximum reflectances of the liquid crystal light control layers satisfy all of the relationships of the following expressions 7 to 9:

$$\lambda 1 < \lambda 2 < \lambda 3 \quad (7)$$

$$\Delta \lambda 1 < \Delta \lambda 2 < \Delta \lambda 3 \quad (8)$$

$$\%R1 < \%R2 < \%R3 \quad (9)$$

Here, $\lambda 1$, $\lambda 2$ and $\lambda 3$ are the peak wavelengths of the reflection spectrums of the liquid crystal light control layers 115, 125 and 135, respectively. $\Delta \lambda 1$, $\Delta \lambda 2$ and $\Delta \lambda 3$ are the half widths of the reflection spectrums of the liquid crystal light control layers 115, 125 and 135, respectively. $\%R1$, $\%R2$ and $\%R3$ are the maximum reflectances of the liquid crystal light control layers 115, 125 and 135, respectively.

The peak wavelengths $\lambda 1$, $\lambda 2$ and $\lambda 3$ are the blue wavelength, the green wavelength and the red wavelength, respectively, as mentioned above.

Moreover, in the multilayer liquid crystal display E1 of the present embodiment, the chromaticity coordinate position, in the XYZ calorimetric system, of the color (white) displayed when all the liquid crystal light control layers are in a state of reflecting at the maximum reflectance, and the distance d from the chromaticity coordinate position of the standard white point satisfy the following expression (10):

$$d \leq 0.02 \quad (10)$$

Further, in the multilayer liquid crystal display E1 of the present embodiment, the filter layer is provided on the viewing side of each of the liquid crystal light control layers as mentioned above. The filter layer 116 provided for the liquid crystal light control layer 115 is for absorbing ultraviolet rays of the wavelength shorter than the wavelength of blue which is the peak wavelength of the selective reflection wavelength range of the liquid crystal light control layer 115. While the filter layer 116 is provided directly on the substrate 111 in this embodiment, it may be provided on the substrate 111 with another member such as a touch panel in between. The filter layer 126 provided for the liquid crystal light control layer 125 is for absorbing the light components of the wavelength of blue shorter than the wavelength of green which is the peak wavelength of the selective reflection wavelength range of the liquid crystal light control layer 125. The filter layer 136 provided for the liquid crystal light control layer 135 is for absorbing the light of the wavelengths of green and blue shorter than the wavelength of red which is the peak wavelength of the selective reflection wavelength range of the liquid crystal light control layer 135.

The reason why the expressions (7) to (10) are satisfied and the reason why the filter layers 116, 126 and 136 are provided are as mentioned above. Consequently, in the multilayer liquid crystal display E1 of the present embodiment, the light use efficiency is high, the hue of the displayed color does not significantly change even when the viewing direction is changed between a direction vertical to the display screen and a direction oblique to the display screen, and the color balance of the displayed color is excellent.

These advantages can be confirmed also by comparing multilayer liquid crystal displays of subsequently described examples 4-1 to 4-3 and comparative examples 2 to 4. In the multilayer liquid crystal displays of the examples 4-1 to 4-3, the relationships of the expressions (7) to (10) are satisfied, and a filter layer is provided for each of the liquid crystal light control layers. On the contrary, no filter layer is provided in the multilayer liquid crystal display of the comparative example 2. The multilayer liquid crystal display of the comparative example 3 does not satisfy the expressions (8) and (10). The multilayer liquid crystal display of the comparative example 4 does not satisfy the expressions (9) and (10).

The examples 4-1 to 4-3 and the comparative examples 2 to 4 will be described.

EXAMPLE 4-1

Figure 22:
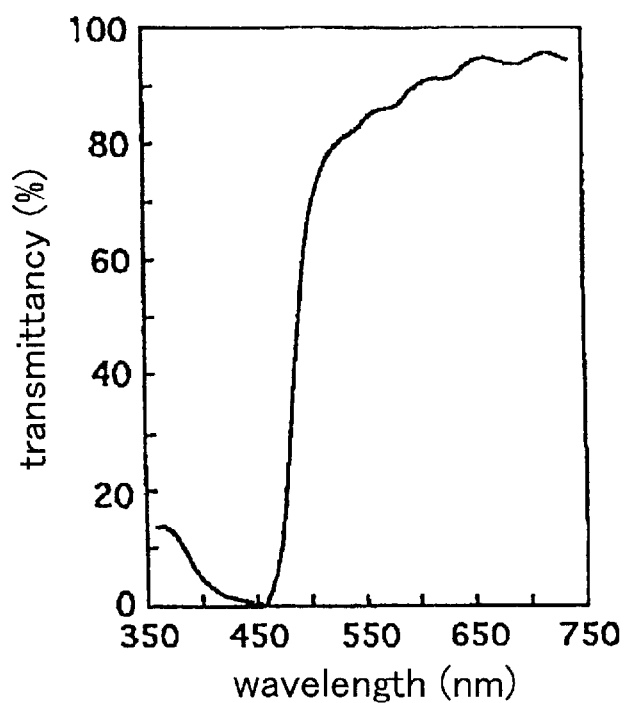
FIG. 22 shows the spectral transmittance of one of two filter layers used in an example 4-1.
Figure 23:
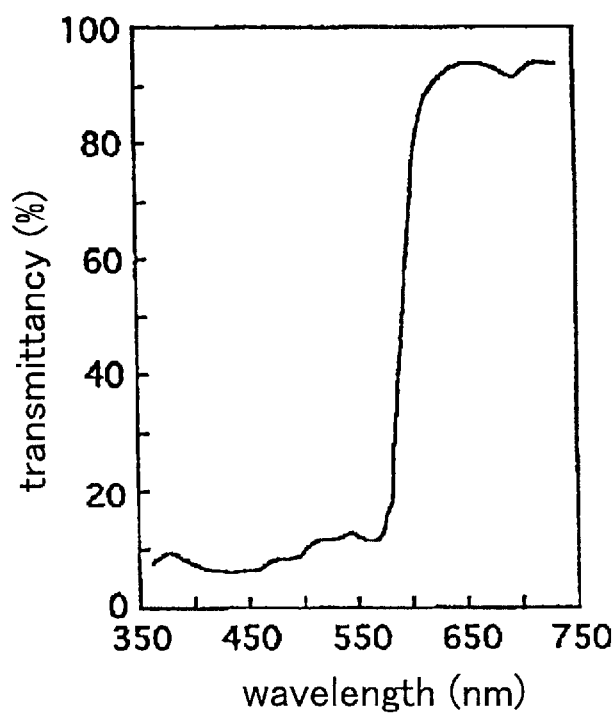
FIG. 23 shows the spectral transmittance of the other one of the two filter layers used in the example 4-1.

In the example 4-1, a multilayer liquid crystal display having the structure shown in FIG. 21 was fabricated in the following manner:

As the transparent substrates with transparent electrodes in the display cells, Sumilite FST-5352 (available from Sumitomo Bakelite Co., Ltd.) was used. As the filter layer 126, one having the spectral transmittance shown in FIG. 22 was used. As the filter layer 136, one having the spectral transmittance shown in FIG. 23 was used.

Figure 24:
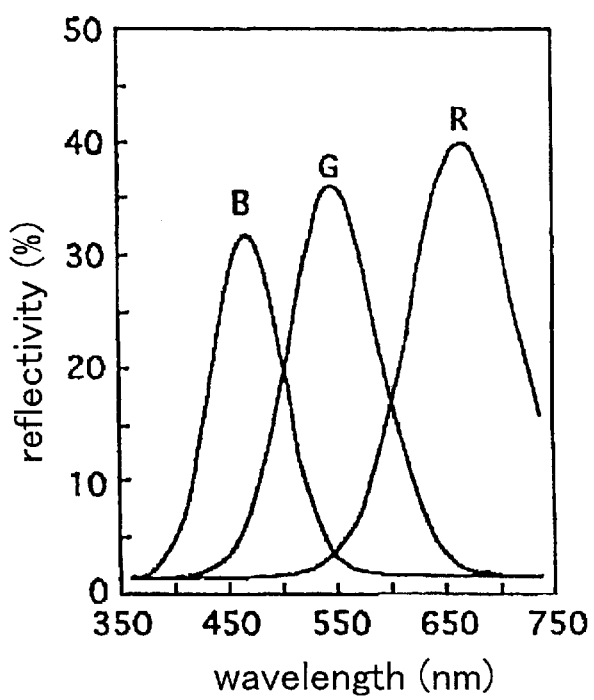
FIG. 24 shows the spectral reflectances (reflection spectrum), in a state of not being stacked, of each individual display cell formed in the example 4-1.

As the liquid crystal for the liquid crystal light control layers, chiral nematic liquid crystal formed by adding a chiral agent to nematic liquid crystal was used. By adjusting the amount of addition of the chiral agent in each liquid crystal light control layer, the selective reflection wavelength and the half width of each liquid crystal light control layer in a state of not being stacked were set as shown in TABLE 2. Moreover, by adjusting the liquid crystal thickness (substrate-to-substrate gap, cell gap) in each liquid crystal light control layer, the maximum reflectance of each liquid crystal light control layer in a state of not being stacked was set as shown in TABLE 2. The reflection spectrum of each individual liquid crystal light control layer in a state of not being stacked was as shown in FIG. 24.

TABLE 2

|  | Peak Reflection Wavelength | Half Width | Maximum Reflectance |
| --- | --- | --- | --- |
| LC light control layer 115 (B) | 470 | 70 | 32 |
| LC light control layer 125 (G) | 550 | 100 | 36 |
| LC light control layer 135 (R) | 670 | 120 | 40 |

By stacking the liquid crystal light control layers as described above, the multilayer liquid crystal display was obtained.

In the multilayer liquid crystal display, a voltage was applied so that the liquid crystal light control layers were in a state of reflecting at the maximum reflectance, and the spectral reflectance and the chromaticity coordinates of the white display portion were measured. For the measurement, a spectrocolorimeter CM-3700d (available from Minolta Co., Ltd.) was used. As the light source, a standard illuminant $D_{65}$ with a color temperature of approximately 6504 K was used.

Figure 25:
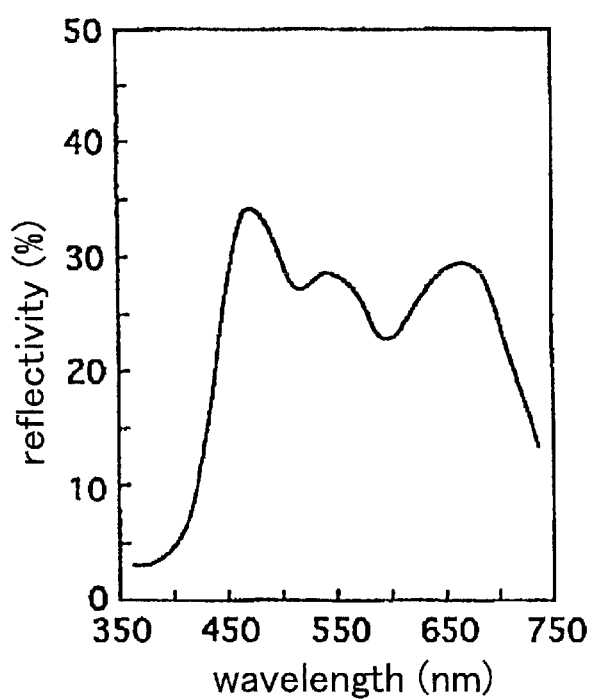
FIG. 25 shows the spectral reflectance of the example 4-1 when each of the liquid crystal light control layers is in a state of reflecting at the maximum reflectance.
Figure 26:
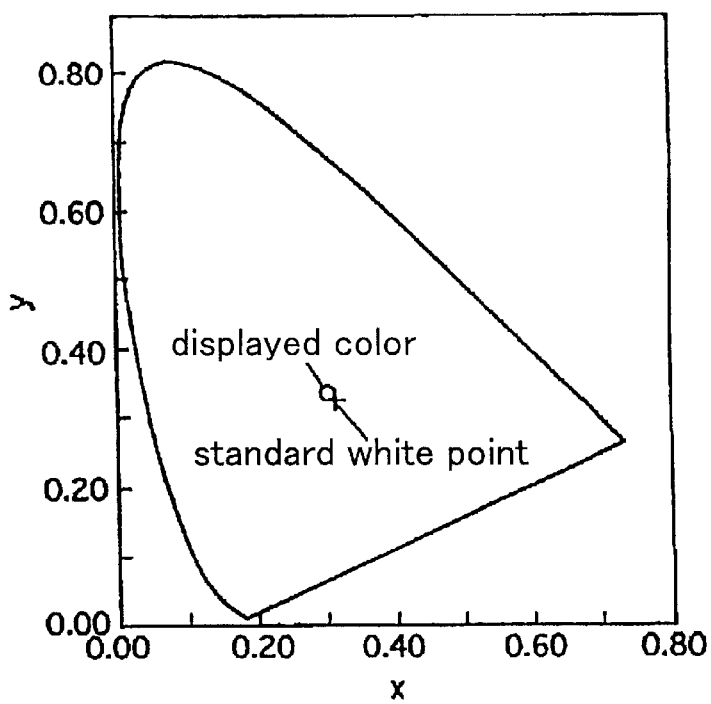
FIG. 26 shows the coordinate position of a displayed color of the example 4-1 on a chromaticity diagram when each of the liquid crystal light control layers is in a state of reflecting at the maximum reflectance.

The spectral reflectance of the displayed white portion was as shown in FIG. 25. The chromaticity coordinates, in the XYZ calorimetric system, of the displayed white portion were (x, y)=(0.3025, 0.3385) (see FIG. 26), and the distance from the standard white point ((x, y)=(0.3127, 0.3290)) was 0.014. That is, white with excellent hue where red, green and blue were well-balancedly mixed was displayed.

In the multilayer liquid crystal display, red, green and blue were displayed by controlling the voltage applied to the electrodes, and the color purity and the brightness were examined. For all of red, green and blue, sufficient color purity and brightness were obtained.

In the multilayer liquid crystal display, since the three primary colors of red, green and blue can be displayed with sufficient color purity and brightness and white which is a mixture of the three primary colors can be displayed with excellent hue as mentioned above, other colors can also be displayed with excellent hue. As described above, the multilayer liquid crystal display was extremely excellent in color reproducibility.

EXAMPLE 4-2

Figure 21:
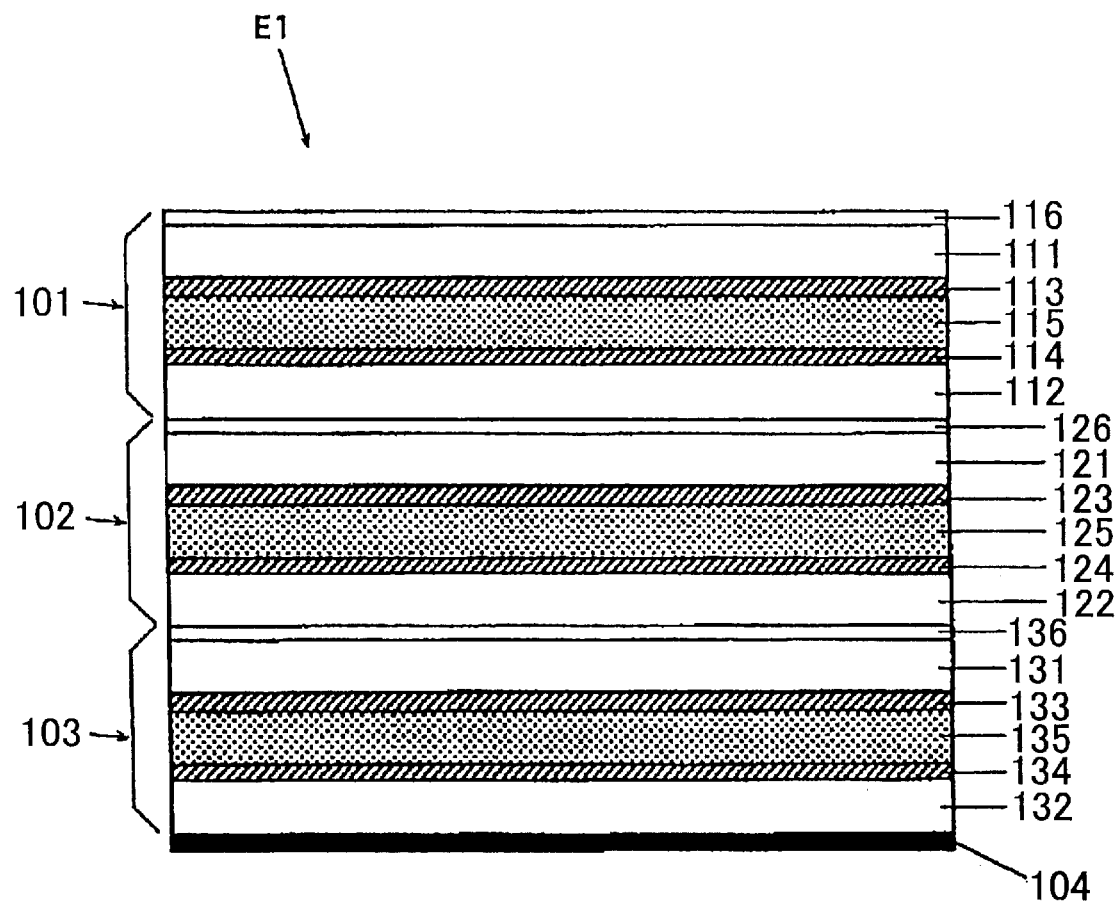
FIG. 21 is a schematic view of a fourth embodiment of the multilayer liquid crystal display according to the present invention.

In the example 4-2, using the same substrates with electrodes and filter layers as those of the example 4-1, a multilayer liquid crystal display having the structure shown in FIG. 21 was fabricated.

Figure 27:
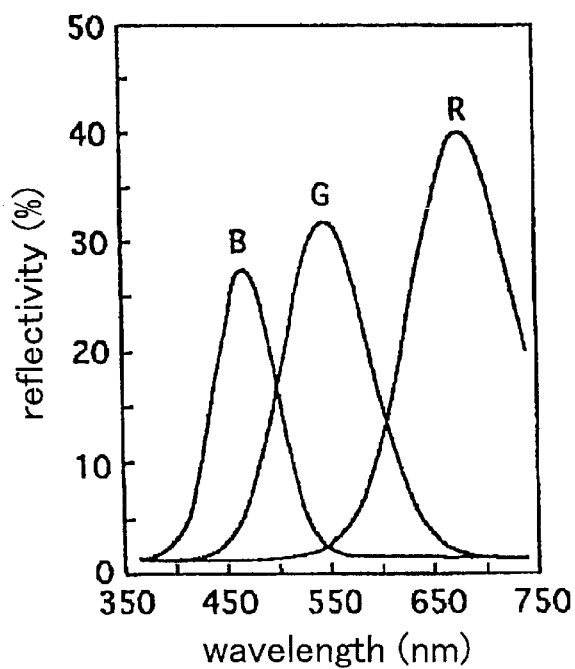
FIG. 27 shows the reflection spectrum, in a state of not being stacked, of each individual liquid crystal light control layer formed in an example 4-2.

The peak wavelength of the selective reflection wavelength range of the reflection spectrum, the half width of the reflection spectrum, and the maximum reflectance of each liquid crystal light control layer in a state of not being stacked were as presented in TABLE 3 shown below. These were adjusted so as to be the values shown in TABLE 3 by adjusting the physical property of the host nematic liquid crystal, the amount of addition of the chiral agent and the thickness of the liquid crystal. The reflection spectrum of each individual liquid crystal light control layer in a state of not being stacked was as shown in FIG. 27.

TABLE 3

|  | Peak Reflection Wavelength | Half Width | Maximum Reflectance |
|---|---|---|---|
| LC light control layer 115 (B) | 470 | 70 | 28 |
| LC light control layer 125 (G) | 550 | 100 | 32 |
| LC light control layer 135 (R) | 680 | 120 | 40 |

By stacking the liquid crystal light control layers, the multilayer liquid crystal display was obtained.

In the multilayer liquid crystal display, the spectral reflectance and the chromaticity coordinates of the white display portion were measured in a manner similar to the example 4-1.

Figure 28:
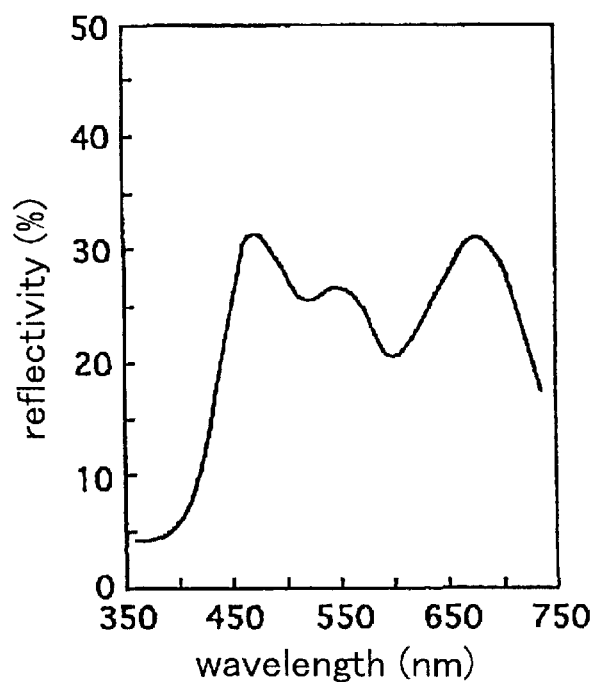
FIG. 28 shows the spectral reflectance of the example 4-2 when each of the liquid crystal light control layers is in a state of reflecting at the maximum reflectance.
Figure 29:
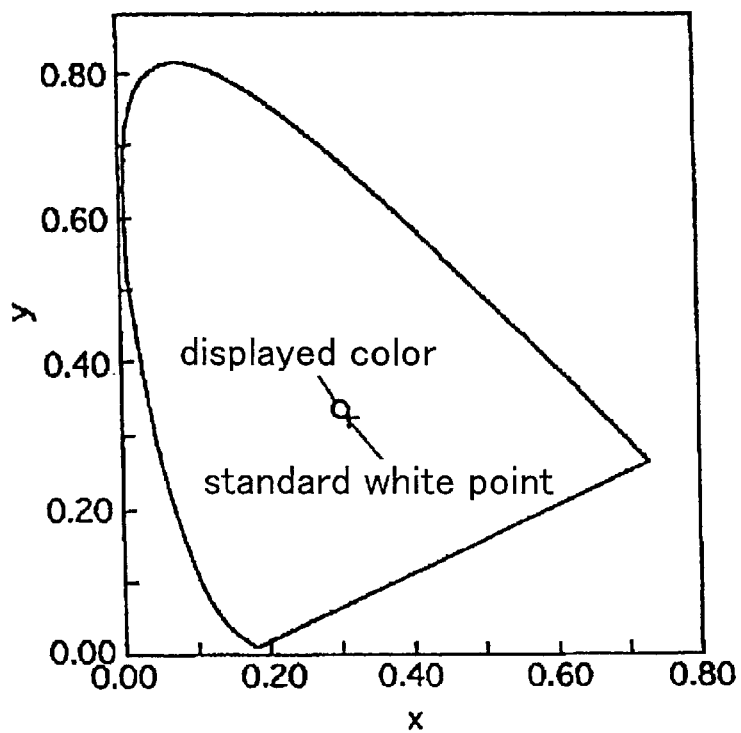
FIG. 29 shows the coordinate position (a standard illuminant $D_{65}$ is used as the light source) of a displayed color of the example 4-2 on a chromaticity diagram when each of the liquid crystal light control layers is in a state of reflecting at the maximum reflectance.

The spectral reflectance of the displayed white portion was as shown in FIG. 28. The chromaticity coordinates, in the XYZ colorimetric system, of the displayed white portion were (x, y)=(0.3018, 0.3388) (see FIG. 29), and the distance from the standard white point was 0.0147. That is, white with excellent hue where red, green and blue were well-balancedly mixed was displayed.

In the multilayer liquid crystal display, red, green and blue were displayed, and the color purity and the brightness were examined. For all of red, green and blue, sufficient color purity and brightness were obtained.

As described above, the multilayer liquid crystal display was extremely excellent in color reproducibility.

EXAMPLE 4-3

The chromaticity coordinates of the white display portion of the multilayer liquid crystal display fabricated in the example 4-2 were measured in a manner similar to the example 4-1 except that a different light source was used. In the example 4-3, a standard illuminant A with a color temperature of 2856 K was used as the light source.

Figure 30:
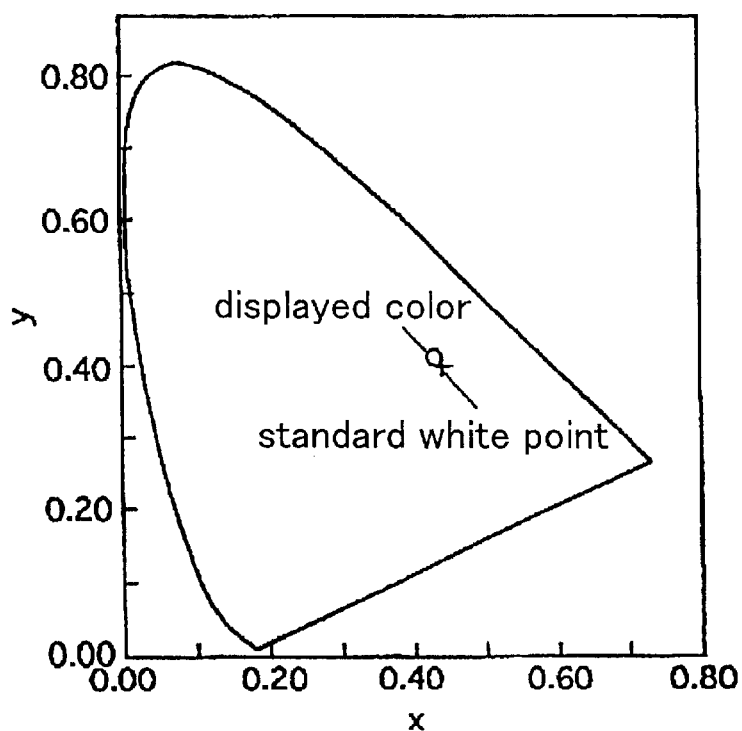
FIG. 30 shows the coordinate position (a standard illuminant A is used as the light source) of a displayed color of the example 4-2 on a chromaticity diagram when each of the liquid crystal light control layers is in a state of reflecting at the maximum reflectance.

The chromaticity coordinates, in the XYZ calorimetric system, of the displayed white portion were (x, y)=(0.4349, 0.4152) (see FIG. 30), and the distance from the standard white point (x, y)=(0.4476, 0.4074) was 0.015. It is apparent that in the multilayer liquid crystal display, even when the light source is changed, the distance from the standard white point is short and excellent white display is provided.

Comparative Example 2

In the comparative example 2, a multilayer liquid crystal display similar to that of the example 4-2 except the following was fabricated. The multilayer liquid crystal display fabricated as the second comparative example had the same structure as that of the multilayer liquid crystal display of FIG. 21 except that the filter layers 116, 126 and 136 were not provided. The peak wavelength of the selective reflection wavelength range of the reflection spectrum, the half width of the reflection spectrum, and the maximum reflectance of each liquid crystal light control layer in a state of not being stacked were the same as those of the liquid crystal light control layers of the example 4-2 (see TABLE 3).

By stacking the liquid crystal light control layers, the multilayer liquid crystal display was obtained.

In the multilayer liquid crystal display, the spectral reflectance and the chromaticity coordinates of the white display portion were measured in a manner similar to the example 4-1.

Figure 31:
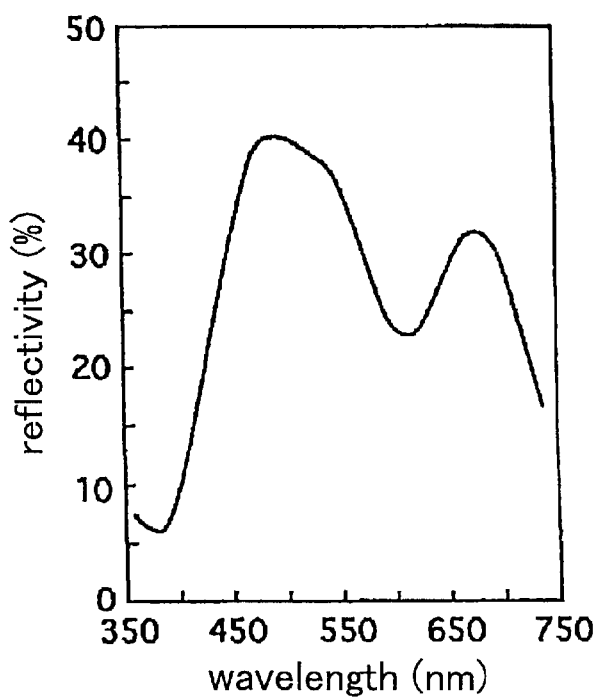
FIG. 31 shows the spectral reflectance of a second comparative example when each of the liquid crystal light control layers are in a state of reflecting at the maximum reflectance.
Figure 32:
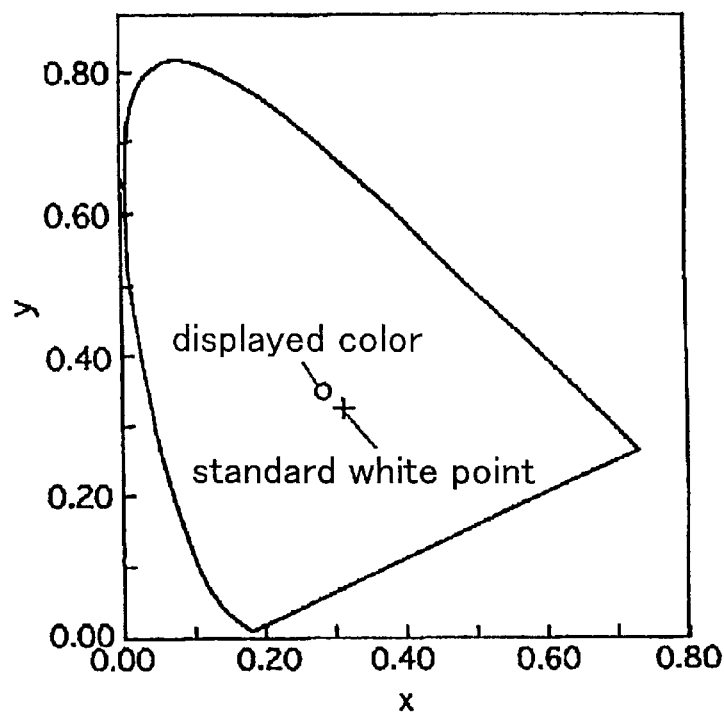
FIG. 32 shows the coordinate position of a displayed color of the second comparative example on a chromaticity diagram when each of the liquid crystal light control layers is in a state of reflecting at the maximum reflectance.

The spectral reflectance of the displayed white portion was as shown in FIG. 31. The chromaticity coordinates, in the XYZ colorimetric system, of the displayed white portion were (x, y)=(0.2842, 0.3488) (see FIG. 32), and the distance from the standard white point was 0.0348. That is, the displayed white was somewhat bluish. Moreover, when any color was displayed, a change in hue was clearly viewed when the viewing direction was changed between a direction vertical to the display screen and a direction oblique to the display screen.

Comparative Example 3

In the comparative example 3, using the same substrates with electrodes and filter layers as those of the example 4-1, a multilayer liquid crystal display having the structure shown in FIG. 21 was fabricated.

Figure 33:
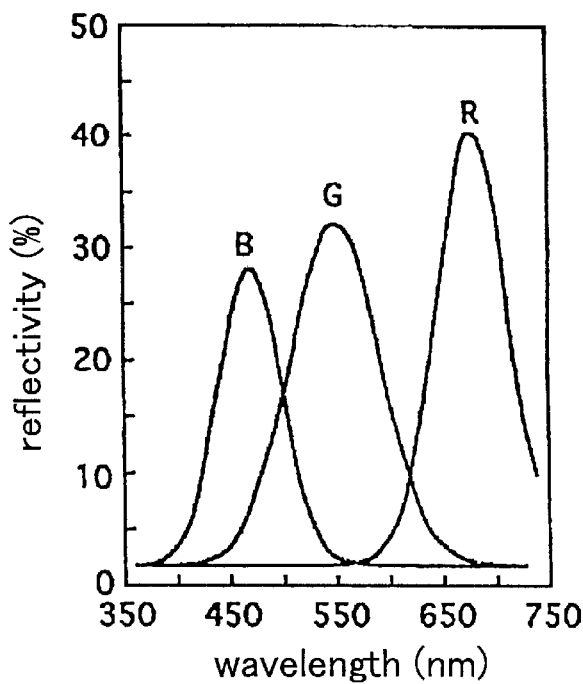
FIG. 33 shows the reflection spectrum, in a state of not being stacked, of each individual liquid crystal light control layer formed in a third comparative example.

The peak wavelength of the selective reflection wavelength range of the reflection spectrum, the half width of the reflection spectrum, and the maximum reflectance of each liquid crystal light control layer were as presented in TABLE 4 shown below. These were adjusted so as to be the values shown in TABLE 4 by adjusting the physical property of the host nematic liquid crystal, the amount of addition of the chiral agent and the thickness of the liquid crystal. The reflection spectrum of each individual liquid crystal light control layer in a state of not being stacked was as shown in FIG. 33.

TABLE 4

|  | Peak Reflection Wavelength | Half Width | Maximum Reflectance |
| --- | --- | --- | --- |
| LC light control layer 115 (B) | 470 | 70 | 28 |
| LC light control layer 125 (G) | 550 | 100 | 32 |
| LC light control layer 135 (R) | 680 | 80 | 40 |

By stacking the liquid crystal light control layers, the multilayer liquid crystal display was obtained.

In the multilayer liquid crystal display, the spectral reflectance and the chromaticity coordinates of the white display portion were measured in a manner similar to the example 4-1.

Figure 34:
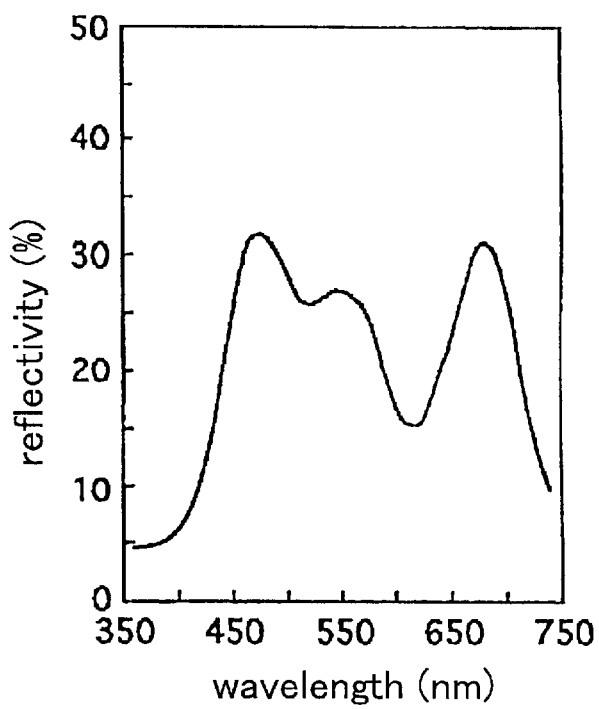
FIG. 34 shows the spectral reflectance of the third comparative example when each of the liquid crystal light control layers is in a state of reflecting at the maximum reflectance.
Figure 35:
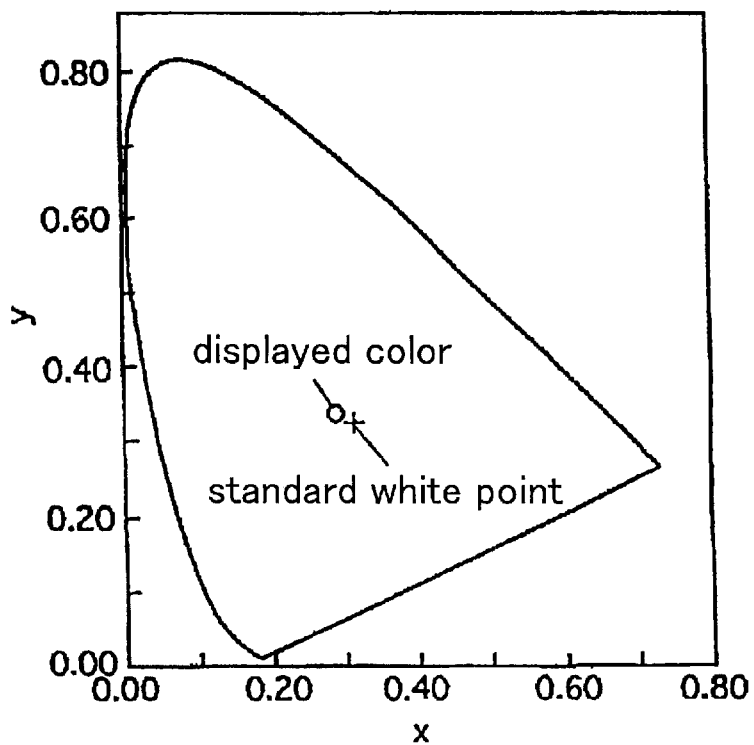
FIG. 35 shows the coordinate position of a displayed color of the third comparative example on a chromaticity diagram when each of the liquid crystal light control layers are in a state of reflecting at the maximum reflectance.

The spectral reflectance of the displayed white portion was as shown in FIG. 34. The chromaticity coordinates, in the XYZ colorimetric system, of the displayed white portion were (x, y)=(0.2840, 0.3388) (see FIG. 35), and the distance from the standard white point was 0.0300. That is, the displayed white was somewhat bluish. Moreover, when any color was displayed, a change in hue was clearly viewed when the viewing direction was changed between a direction vertical to the display screen and a direction oblique to the display screen. Since the half width of the reflection spectrum of the liquid crystal light control layer for displaying red was small, the change in hue was particularly great when only red is displayed.

Comparative Example 4

In the comparative example 4, using the same substrates with electrodes and filter layers as those of the example 4-1, a multilayer liquid crystal display having the structure shown in FIG. 21 was fabricated.

Figure 36:
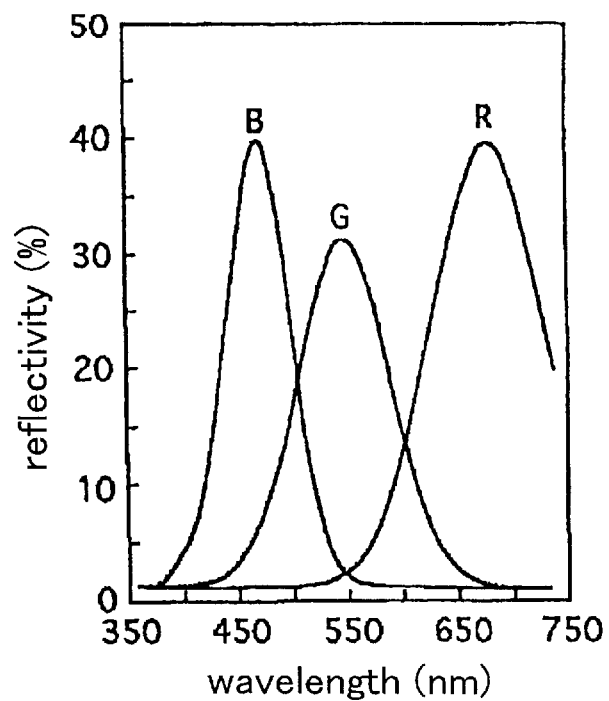
FIG. 36 shows the reflection spectrum, in a state of not being stacked, of each individual liquid crystal light control layer formed in a fourth comparative example.

The peak wavelength of the selective reflection wavelength range of the reflection spectrum, the half width of the reflection spectrum, and the maximum reflectance of each liquid crystal light control layer were as presented in TABLE 5 shown below. These were adjusted so as to be the values shown in TABLE 5 by adjusting the physical property of the host nematic liquid crystal, the amount of addition of the chiral agent and the thickness of the liquid crystal. The reflection spectrum of each individual liquid crystal light control layer in a state of not being stacked was as shown in FIG. 36.

TABLE 5

|  | Peak Reflection Wavelength | Half Width | Maximum Reflectance |
| --- | --- | --- | --- |
| LC light control layer 115 (B) | 470 | 70 | 40 |
| LC light control layer 125 (G) | 550 | 100 | 32 |
| LC light control layer 135 (R) | 680 | 120 | 40 |

By stacking the liquid crystal light control layers, the multilayer liquid crystal display was obtained.

In the multilayer liquid crystal display, the spectral reflectance and the chromaticity coordinates of the white display portion were measured in a manner similar to the example 4-1.

Figure 37:
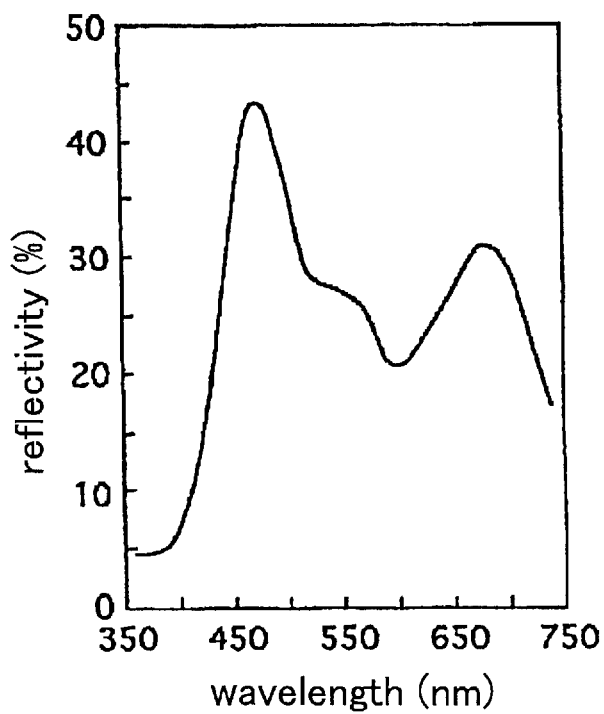
FIG. 37 shows the spectral reflectance of a fourth comparative example when each of the liquid crystal light control layers is in a state of reflecting at the maximum reflectance.
Figure 38:
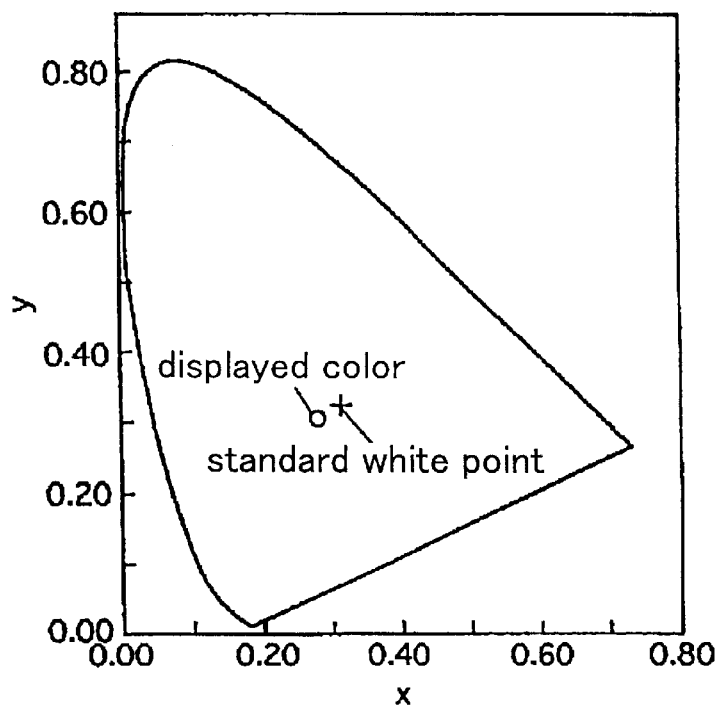
FIG. 38 shows the coordinate position of a displayed color of a fourth comparative example on a chromaticity diagram when each of the liquid crystal light control layers is in a state of reflecting at the maximum reflectance.

The spectral reflectance of the displayed white portion was as shown in FIG. 37. The chromaticity coordinates, in the XYZ calorimetric system, of the displayed white portion were (x, y)=(0.2772, 0.3079) (see FIG. 38), and the distance from the standard white point was 0.0414. That is, the displayed white was somewhat bluish.

As described above, it is apparent that in the multilayer liquid crystal displays of the examples 4-1 to 4-3 according to the fourth embodiment of the present invention, the color balance when a mixed color (such as white) is displayed is excellent, the color purity and the brightness of the three primary colors (red, green, blue) are excellent, and the change in hue caused when the viewing direction is changed is small compared to the multilayer liquid crystal displays of the liquid crystal displays of the comparative examples 2-4.

(Fifth Embodiment)

In the multilayer liquid crystal display E1 of the fourth embodiment described above, the substrates 112 and 121 disposed between adjoining liquid crystal light control layers may alternately be one transparent substrate. The substrates 122 and 131 may also alternately be one transparent substrate. For example, they may be as shown in a multilayer liquid crystal display E2 of FIG. 39.

Figure 39:
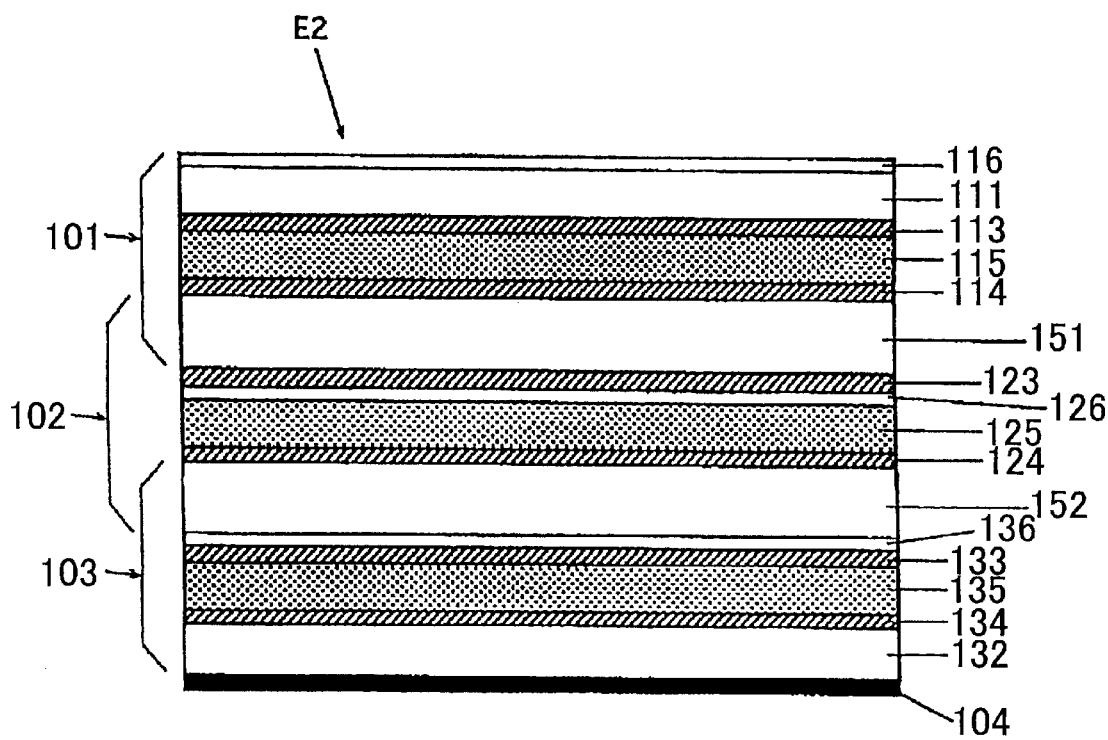
FIG. 39 schematically shows the structure of another example of the liquid crystal display according to the present invention.

In the multilayer liquid crystal display E2 shown in FIG. 39, only one substrate 151 is disposed between the liquid crystal light control layers 115 and 125. The electrodes 114 and 123 are formed on the both surfaces of the substrate 151. Likewise, only one substrate 152 is disposed between the liquid crystal light control layers 125 and 135. The electrodes 124 and 133 are formed on the both surfaces of the substrate 152.

In the multilayer liquid crystal display E2, the liquid crystal light control layer 115 is sandwiched between the substrate 111 where the electrode 113 is formed and the substrate 151 where the electrode 114 is formed. The liquid crystal light control layer 125 is sandwiched between the substrate 151 where the electrode 123 is formed and the substrate 152 where the electrode 124 is formed. The liquid crystal light control layer 135 is sandwiched between the substrate 152 where the electrode 133 is formed and the substrate 132 where the electrode 134 is formed.

In the multilayer liquid crystal display E2, it can be considered that the display cell 101 is constituted by the filter layer 116, the substrate 111, the electrode 113, the liquid crystal light control layer 115, the electrode 114 and the substrate 151. It can be considered that the display cell 102 is constituted by the substrate 151, the electrode 123, the filter layer 126, the liquid crystal light control layer 125, the electrode 124 and the substrate 152. It can be considered that the display cell 103 is constituted by the substrate 152, the filter layer 136, the electrode 133, the liquid crystal light control layer 135, the electrode 134 and the substrate 132. That is, the substrate 151 is common to the display cell 101 and the display cell 102. The substrate 152 is common to the display cell 102 and the display cell 103.

In the multilayer liquid crystal display E2, the filter layers are disposed in the following manner: The filter layer 126 for absorbing light of the wavelength of blue which filter 126 is provided for the liquid crystal light control layer 125 for displaying green is disposed between the electrode 123 and the liquid crystal light control layer 125. The filter layer 136 for absorbing light of wavelengths of green and blue which filter layer 136 is provided for the liquid crystal light control layer 135 for displaying red is disposed between the substrate 152 and the electrode 133.

Providing common substrates in a multilayer liquid crystal display as described above produces advantages such that the thickness can be reduced.

In the multilayer liquid crystal display E2, since the liquid crystal light control layers satisfy the expressions (7) to (10)

and the filter layers 116, 126 and 136 are provided for the liquid crystal light control layers, the light use efficiency is high, the hue of the displayed color does not significantly change even when the viewing direction is changed between a direction vertical to the display screen and a direction oblique to the display screen, and the color balance of the displayed color is excellent like in the liquid crystal display E1 of the fifth embodiment.

While filter layers are used as the filter means for cutting or absorbing undesired light in the first to fourth embodiments, a coloring agent may be contained in the liquid crystal light control layers instead. For example, instead of the filter layer provided between the B liquid crystal light control layer and the G liquid crystal light control layer, a coloring agent that absorbs blue and transmits green and red may be contained in the G liquid crystal light control layer. Likewise, instead of the filter layer provided between the G liquid crystal light control layer and the R liquid crystal light control layer, a coloring agent that absorbs blue and green and transmits red may be included in the R liquid crystal light control layer Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A liquid crystal display comprising:
    a plurality of liquid crystal light control layers each of which includes liquid crystal exhibiting a cholesteric phase and having a peak wavelength of a selective reflection wavelength range of a reflection spectrum in the visible wavelength range, the liquid crystal light control layers being stacked in such order that the peak wavelength of any of the liquid crystal light control layers is larger than that of the adjoining liquid crystal light control layer on the viewing side,
    wherein a half width of the reflection spectrum of any of the liquid crystal light control layers is larger than that of the adjoining liquid crystal light control layer on the viewing side,
    wherein a maximum reflectance of the reflection spectrum of any of the liquid crystal light control layers is higher than that of the adjoining liquid crystal light control layer on the viewing side, and
    wherein the chromaticity coordinate position, in the XYZ colorimetric system, of a color displayed when all the liquid crystal light control layers are in a state of reflecting at the maximum reflectance is present in a range within a distance of 0.02 from the chromaticity coordinate position of the standard white point.

2. A liquid crystal display as claimed in claim 1, wherein the liquid crystal light control layers include, from the viewing side, a blue liquid crystal light control layer, a green liquid crystal light control layer, and a red liquid crystal light control layer.

3. A liquid crystal display as claimed in claim 2, further comprising:
    a red filter layer disposed between the green liquid crystal light control layer and the red liquid crystal light control layer, the red filter layer being for absorbing at least part of light components in a wavelength range shorter than the selective reflection wavelength range of the red liquid crystal light control layer.

4. A liquid crystal display as claimed in claim 2, further comprising:
    a yellow filter layer disposed between the blue liquid crystal light control layer and the green liquid crystal light control layer, the yellow filter layer being for absorbing at least part of light components in a wavelength range shorter than the selective reflection wavelength range of the green liquid crystal light control layer.

5. A liquid crystal display as claimed in claim 2, further comprising:
    an ultraviolet cut filter disposed at the viewing side of the blue liquid crystal light control layer, the ultraviolet cut filter layer being for absorbing at least part of light components in a wavelength range shorter than the selective reflection wavelength range of the blue liquid crystal light control layer.

6. A liquid crystal display as claimed in claim 1, wherein each of the liquid crystal light control layers is sandwiched between substrates.

7. A liquid crystal display as claimed in claim 6, wherein a plurality of electrodes is formed on each of the substrates.

8. A liquid crystal display as claimed in claim 7, wherein the electrodes are made of an ITO.

9. A liquid crystal display as claimed in claim 6, wherein all of the substrates are transparent.

10. A liquid crystal display as claimed in claim 6, wherein one of the substrates that is situated farthest from the viewing side is black.

11. A liquid crystal display as claimed in claim 6, wherein at least one of the substrates is flexible.

12. A liquid crystal display as claimed in claim 1, wherein each of the liquid crystals of the liquid crystal light control layers is a chiral nematic liquid crystal.

13. A liquid crystal display as claimed in claim 1, further comprising:
    filter means provided on the viewing side of or in at least one of the liquid crystal light control layers, the filter means being for absorbing at least part of light components in a wavelength range shorter than the selective reflection wavelength range of the at least one of the liquid crystal light control layers.

14. A liquid crystal display as claimed in claim 13, wherein the filter means is a filter layer provided on the electrodes that are provided on one of the substrates situated on the viewing side of the at least one of the liquid crystal light control layers.

15. A liquid crystal display as claimed in claim 13, wherein said filter means comprises a coloring agent added in the at least one liquid crystal light control layer.

16. A liquid crystal display comprising:
    a plurality of liquid crystal light control layers each of which includes liquid crystal exhibiting a cholesteric phase and having a peak wavelength of a selective reflection wavelength range of a reflection spectrum in the visible wavelength range, the liquid crystal light control layers being stacked in such order that the peak wavelength of any of the liquid crystal light control layers is larger than that of the adjoining liquid crystal light control layer on the viewing side; and
    filter means provided on the viewing side of or in at least one of the liquid crystal light control layers,
    wherein a transmittance of the filter means is 10 to 70% in the selective reflection wavelength range of the liquid crystal light control layer situated on the viewing side of the filter means.

17. A liquid crystal display as claimed in claim 16, wherein the liquid crystal light control layers include, from the viewing side, a blue liquid crystal light control layer, a green liquid crystal light control layer, and a red liquid crystal light control layer.

18. A liquid crystal display as claimed in claim 17, wherein the filter means is a red filter layer disposed between the green liquid crystal light control layer and the red liquid crystal light control layer.

19. A liquid crystal display as claimed in claim 17, wherein the filter means is a yellow filter layer disposed between the blue liquid crystal light control layer and the green liquid crystal light control layer.

20. A liquid crystal display as claimed in claim 16, wherein the filter means comprises a coloring agent added in the at least one liquid crystal light control layer.

21. A liquid crystal display as claimed in claim 16, wherein each of the liquid crystal light control layers is sandwiched between substrates.

22. A liquid crystal display as claimed in claim 21, wherein a plurality of electrodes is formed on each of the substrates.

23. A liquid crystal display as claimed in claim 22, wherein the filter means is a filter layer provided on the electrodes that are provided on one of the substrates situated on the viewing side of the at least one of the liquid crystal light control layers.

24. A liquid crystal display as claimed in claim 22, wherein the filter means is a filter layer provided on one of the substrates situated on the viewing side of the at least one of the liquid crystal light control layers, and the electrodes are provided on the filter layer.

25. A liquid crystal display as claimed in claim 22, wherein the electrodes are made of an ITO.

26. A liquid crystal display as claimed in claim 21, wherein all of the substrates are transparent.

27. A liquid crystal display as claimed in claim 21, wherein one of the substrates that is situated farthest from the viewing side is black.

28. A liquid crystal display as claimed in claim 21, wherein at least one of the substrates is flexible.

29. A liquid crystal display as claimed in claim 16, wherein each of the liquid crystals of the liquid crystal light control layers is a chiral nematic liquid crystal.

30. A liquid crystal display as claimed in claim 29, wherein the liquid crystal light control layers include, from the viewing side, a blue liquid crystal light control layer, a green liquid crystal light control layer, and a red liquid crystal light control layer.

31. A liquid crystal display as claimed in claim 30, wherein the filter means is a red filter layer disposed between the green liquid crystal light control layer and the red liquid crystal light control layer.

32. A liquid crystal display as claimed in claim 30, wherein the filter means is a yellow filter layer disposed between the blue liquid crystal light control layer and the green liquid crystal light control layer.

33. A liquid crystal display as claimed in claim 30, wherein the filter means is an ultraviolet cut filter disposed at the viewing side of the blue liquid crystal light control layer.

34. A liquid crystal display comprising:
  a plurality of liquid crystal light control layers each of which includes liquid crystal exhibiting a cholesteric phase and having a peak wavelength of a selective reflection wavelength range of a reflection spectrum in the visible wavelength range, the liquid crystal light control layers being stacked in such order that the peak wavelength of any of the liquid crystal light control layers is larger than that of the adjoining liquid crystal light control layer on the viewing side; and
  filter means provided on the viewing side of or in at least one of the liquid crystal light control layers, wherein the filter means absorbs light components in a shorter wavelength range from the peak wavelength of the liquid crystal light control layer situated not closer to the viewing side than the filter means to 1.3 to 1.5 times of the half width of the reflection spectrum of the liquid crystal light control layer situated not closer to the viewing side than the filter means,
  wherein a transmittance of the filter means in the shorter wavelength range is 10 to 70%.

35. A liquid crystal display as claimed in claim 34, wherein each of the liquid crystal light control layers is sandwiched between substrates.

36. A liquid crystal display as claimed in claim 35, wherein a plurality of electrodes is formed on each of the substrates.

37. A liquid crystal display as claimed in claim 36, wherein the filter means is a filter layer provided on the electrodes that are provided on one of the substrates situated on the viewing side of the at least one of the liquid crystal light control layers.

38. A liquid crystal display as claimed in claim 36, wherein the filter means is a filter layer provided on one of the substrates situated on the viewing side of the at least one of the liquid crystal light control layers, and the electrodes are provided on the filter layer.

39. A liquid crystal display as claimed in claim 36, wherein the electrodes are made of an ITO.

40. A liquid crystal display as claimed in claim 35, wherein all of the substrates are transparent.

41. A liquid crystal display as claimed in claim 35, wherein one of the substrates that is situated farthest from the viewing side is black.

42. A liquid crystal display as claimed in claim 35, wherein at least one of the substrates is flexible.

43. A liquid crystal display as claimed in claim 34, wherein each of the liquid crystals of the liquid crystal light control layers is a chiral nematic liquid crystal.

44. A liquid crystal display comprising:
  a plurality of liquid crystal light control layers each of which includes liquid crystal exhibiting a cholesteric phase and having a peak wavelength of a selective reflection wavelength range of a reflection spectrum in the visible wavelength range, the liquid crystal light control layers being stacked in such order that the peak wavelength of any of the liquid crystal light control layers is larger than that of the adjoining liquid crystal light control layer on the viewing side; and
  filter means provided on the viewing side of or in at least one of the liquid crystal light control layers,
  wherein the filter means absorbs light components in a shorter wavelength range of 120 to 150 nm from the peak wavelength of the liquid crystal light control layer situated not closer to the viewing side than the filter means, and
  wherein a transmittance in the shorter wavelength range is 10 to 70%.

45. A liquid crystal display as claimed in claim 44, wherein the liquid crystal light control layers include, from the viewing side, a blue liquid crystal light control layer, a green liquid crystal light control layer, and a red liquid crystal light control layer.

46. A liquid crystal display as claimed in claim 45, wherein the filter means is a red filter layer disposed between the green liquid crystal light control layer and the red liquid crystal light control layer.

47. A liquid crystal display as claimed in claim 45, wherein the filter means is a yellow filter layer disposed between the blue liquid crystal light control layer and the green liquid crystal light control layer.

48. A liquid crystal display as claimed in claim 45, wherein the filter means is an ultraviolet cut filter disposed at the viewing side of the blue liquid crystal light control layer.

49. A liquid crystal display as claimed in claim 44, wherein each of the liquid crystal light control layers is sandwiched between substrates.

50. A liquid crystal display as claimed in claim 49, wherein a plurality of electrodes is formed on each of the substrates.

51. A liquid crystal display as claimed in claim 50, wherein the filter means is a filter layer provided on the electrodes that are provided on one of the substrates situated on the viewing side of the at least one of the liquid crystal light control layers.

52. A liquid crystal display as claimed in claim 50, wherein the filter means is a filter layer provided on one of the substrates situated on the viewing side of the at least one of the liquid crystal light control layers, and the electrodes are provided on the filter layer.

53. A liquid crystal display as claimed in claim 50, wherein the electrodes are made of an ITO.

54. A liquid crystal display as claimed in claim 49, wherein all of the substrates are transparent.

55. A liquid crystal display as claimed in claim 49, wherein one of the substrates that is situated farthest from the viewing side is black.

56. A liquid crystal display as claimed in claim 49, wherein at least one of the substrates is flexible.

57. A liquid crystal display as claimed in claim 44, wherein each of the liquid crystals of the liquid crystal light control layers is a chiral nematic liquid crystal.

* * * * *